(12) United States Patent
Janes et al.

(10) Patent No.: US 10,643,488 B2
(45) Date of Patent: May 5, 2020

(54) SYSTEM AND METHOD OF ASSESSING DEPTH-OF-UNDERSTANDING

(71) Applicant: LYSTNR, LLC, Mesa, AZ (US)

(72) Inventors: Kade Janes, Mesa, AZ (US); Brian Carr, Mesa, AZ (US)

(73) Assignee: LYSTNR, LLC, Mesa, AZ (US)

( * ) Notice: Subject to any disclaimer, the term of this patent is extended or adjusted under 35 U.S.C. 154(b) by 16 days.

(21) Appl. No.: 15/630,777

(22) Filed: Jun. 22, 2017

(65) Prior Publication Data

US 2017/0372630 A1  Dec. 28, 2017

Related U.S. Application Data

(60) Provisional application No. 62/354,033, filed on Jun. 23, 2016.

(51) Int. Cl.
*G09B 7/02* (2006.01)
*G06F 17/27* (2006.01)

(52) U.S. Cl.
CPC .............. *G09B 7/02* (2013.01); *G06F 17/27* (2013.01); *G06F 17/2705* (2013.01)

(58) Field of Classification Search
None
See application file for complete search history.

(56) References Cited

U.S. PATENT DOCUMENTS

| 5,954,516 | A | * | 9/1999 | Heinberg | G09B 3/06 434/322 |
| 6,115,683 | A | * | 9/2000 | Burstein | G06F 17/2705 434/353 |
| 8,706,022 | B2 | | 4/2014 | Dunk et al. | |
| 2003/0200077 | A1 | * | 10/2003 | Leacock | G06F 17/30684 704/1 |
| 2003/0207244 | A1 | * | 11/2003 | Sakai | G09B 5/06 434/350 |
| 2004/0143630 | A1 | | 7/2004 | Kaufmann et al. | |

(Continued)

OTHER PUBLICATIONS

Tate, Incorporated, iResponse PRO Classroom Responder System on the App Store, iTunes Preview, Aug. 24, 2015.

(Continued)

*Primary Examiner* — Bruk A Gebremichael
(74) *Attorney, Agent, or Firm* — Booth Udall Fuller, PLC

(57) ABSTRACT

A computer-implemented method of assessing depth-of-understanding is disclosed. The method may comprise receiving a target response associated with a question. The method may comprise receiving a learner response associated with the question and calculating a total relevancy score for each of the learner responses by determining a relevancy score with respect to each word, keyword, and keyphrase in the target response text and in light of all learner responses, and summing all relevancy scores determined for each learner response. The method may also comprise assigning each of the learner responses to one of a plurality of tiers based upon which tier contains the total relevancy score of the learner response and sending to a facilitator client device an assessed response for each of the learner responses. The assignment of each of the learner responses to one of the tiers may be substantially concurrent with the receipt of the learner response.

18 Claims, 18 Drawing Sheets

(56) References Cited

U.S. PATENT DOCUMENTS

| | | | |
|---|---|---|---|
| 2005/0100875 A1* | 5/2005 | Best | G09B 7/02 434/362 |
| 2009/0035733 A1* | 2/2009 | Meitar | G09B 7/00 434/118 |
| 2009/0226872 A1* | 9/2009 | Gunther | G09B 7/00 434/350 |
| 2009/0241033 A1 | 9/2009 | Mujtaba | |
| 2012/0052474 A1* | 3/2012 | Voehl | G09B 7/07 434/350 |
| 2012/0164619 A1 | 6/2012 | Meer | |
| 2012/0251997 A1* | 10/2012 | Kojo | G09B 5/06 434/379 |
| 2013/0122481 A1 | 5/2013 | Rovner | |
| 2013/0164725 A1 | 6/2013 | Robbins et al. | |
| 2013/0302775 A1 | 11/2013 | King et al. | |
| 2014/0017655 A1* | 1/2014 | Mayumi | G09B 7/02 434/353 |
| 2014/0059582 A1 | 2/2014 | Knowles et al. | |
| 2015/0044659 A1* | 2/2015 | Basu | G09B 7/04 434/350 |

OTHER PUBLICATIONS

K-12 Solutions, Educational Technology for K-12 Classrooms, Turning Technologies, Aug. 21, 2015.

\* cited by examiner

SYSTEM AND METHOD OF ASSESSING DEPTH-OF-UNDERSTANDING

RELATED APPLICATIONS

This application claims the benefit of U.S. provisional patent application 62/354,033, filed Jun. 23, 2016 titled "Educational System for Assessing Response Relevance," the entirety of the disclosure of which is hereby incorporated by this reference.

TECHNICAL FIELD

Aspects of this document relate generally to assessing depth-of-understanding.

BACKGROUND

The teaching process can be most effective when the teacher is able to determine how well a particular concept is being received, or what student knowledge is. Traditionally, a teacher could test student comprehension by asking a question to the class, and then wait for a volunteer to answer, or simply ask a student to respond whether the student wants to respond or not. However, a reluctance to speak out in class may not be an indication of a lack of understanding, and as a method can be slow and incomplete, feasibly measuring only the understanding of a few selected students within normal time constraints.

Conventional electronic or computer-based methods for assessing student knowledge have made it possible to quickly receive feedback from an entire class in response to a question at a same time. However, this speed is only made possible by requiring the questions posed to the class to be in a particular form with limited response options, such as multiple choice or true/false questions. While such simple questions are easy to evaluate, they do not provide a very accurate measure of depth-of-understanding. Multiple choice questions can prompt the student with the correct answer they otherwise would not have remembered, and random guesses can be indistinguishable from a response coming from a deep mastery of the subject.

Furthermore, conventional electronic solutions may be costly, ranging from about $2,500-$5,000 (USD) depending on how the system is setup and the class size. In addition, such systems often require a lot of training and configuration before they are operational and are being used efficiently. Other commercially available educational systems that can run using existing devices, such as laptops, smartphones, and tablets, have also been made available to accept responses to multiple choice questions. Examples of commercially available systems included: Poll Everywhere, Top Hat, Infuse Learning, Quiz Socket, Kahoot, Verso, Secretive, and Mentimeter.

SUMMARY

According to an aspect, a computer-implemented method of assessing depth-of-understanding may include receiving, by an assessor server, a target response associated with a question. The target response may include a target response text, and the target response text may include at least one of a word, a keyword, and a keyphrase. The method may also include receiving, by the assessor server, at least one learner response associated with the question. Each of the at least one learner response may be received through a network from a different learner client device and includes a learner response text and an identifier. Furthermore, the method may include normalizing, with a processor of the assessor server, the learner response text of each of the at least one learner response, and normalizing, with the processor, the target response text. Additionally, the method may include calculating, with the processor, a total relevancy score for each of the at least one learner responses by determining a relevancy score with respect to each word, keyword, and keyphrase in the target response text and in light of all learner responses and summing all relevancy scores determined for each learner response. The method may then includes defining, with the processor, a plurality of tiers by partitioning a relevancy score range having an upper bound and a lower bound into a plurality of subset ranges. Each tier of the plurality of tiers may describe one of the plurality of subset ranges. The method may include assigning, with the processor, each of the at least one learner responses to one of the plurality of tiers based upon which of the plurality of subset ranges contains the total relevancy score of the learner response, as well as sending, to a facilitator client device, an assessed response for each of the at least one learner responses. The assessed response may include one of the at least one learner responses and at least one of the associated total relevancy score and the associated tier. Finally, the method may include sending, by the assessor server, at least part of the assessed response for each of the at least one learner responses to the learner client device associated with the identifier of the learner response. The assignment of each of the at least one learner response to one of the plurality of tiers may be substantially concurrent with the receipt of the at least one learner response.

Particular embodiments may comprise one or more of the following features. The relevancy score with respect to each word, keyword, and keyphrase in the target response text may be determined using a term frequency/inverse document frequency (TF/IDF) weighting. The target response text may include at least one keyword or keyphrase and the target response may include a weight associated with each of the at least one keyword or keyphrase. Calculating the total relevancy score may further include multiplying any relevancy score determined with respect to each of the at least one keyword or keyphrase by the associated weight before the relevancy scores are summed for each of the at least one learner responses. At least one weight may be negative. The computer-implemented method may further include receiving, by the assessor server, at least one additional learner response associated with the question, and normalizing, with the processor, the learner response text of each of the at least one additional learner responses. The method may also include calculating, with the processor, an updated total relevancy score for each of the at least one learner responses and each of the at least one additional learner responses, and redefining, with the processor, the upper bound and the lower bound of the score range based at least in part upon the updated total relevancy scores. The method may include redefining, with the processor, the plurality of tiers by partitioning the relevancy score range into a plurality of updated subset ranges. Each tier of the plurality of tiers may describe one of the plurality of updated subset ranges. The method may also include assigning, with the processor, each of the at least one learner response and each of the at least one additional learner response to one of the plurality of tiers based upon which of the plurality of updated subset ranges contains the associated updated total relevancy score. The method may also include sending, to the facilitator client device, an updated assessed response for each of the at least one learner response and each of the at least one additional learner response. Each updated assessed response may include one of the at least one learner response or additional learner response and the associated updated total relevancy score and tier.

The method may include receiving, from the facilitator client device, a revised target response. The revised target response may include the target response modified by at least one of an additional keyword and associated weight, an additional keyphrase and associated weight, a revised target response text, the removal of a cancelled keyword, the removal of a cancelled keyphrase and/or an adjusted weight. The method may include calculating, with the processor, an updated total relevancy score for each of the at least one learner response, and/or redefining, with the processor, the upper bound and the lower bound of the score range based at least in part upon the updated total relevancy scores. The method may also include redefining, with the processor, the plurality of tiers by partitioning the relevancy score range into a plurality of updated subset ranges. Each tier of the plurality of tiers may describe one of the plurality of updated subset ranges. The method may include assigning, with the processor, each of the at least one learner response to one of the plurality of tiers based upon which of the plurality of updated subset ranges contains the associated updated total relevancy score, and sending, to the facilitator client device, an updated assessed response for each of the at least one learner response. Each updated assessed response may include one of the at least one learner response, the associated updated total relevancy score and associated tier. The method may include receiving, by the assessor server, a course data comprising a lesson data, the lesson data comprising the question, associating a token with the lesson data, receiving, from a learner client device, the token, receiving, from a board client device, the token, sending, by the assessor server, the question to at least one of the learner client device and the board client device, and/or sending, to the board client device, at least one of the learner response text of one of the at least one assessed response, a response assessment summary, and at least part of the target response text, in response to a display command received from the facilitator client device. The facilitator client device, the learner client device, and/or the board client device may all include a web interface. Normalizing may include at least one of removing non-standard characters, removing case, removing one or more stop words, lemmatizing, and/or correcting spelling using a subject-matter-specific dictionary. The method may include extrapolating, with the processor, the target response text by automatically identifying related keywords, related keyphrases, and associated weights based upon at least one of historical questions, materials associated with a course, materials associated with a lesson, and a subject-matter-specific dictionary. The method may also include sending, by the assessor server, an assessment evaluation request, receiving, by the assessor server, a facilitator response, and/or storing the facilitator response with the associated question and target response. The lower bound may be the lowest total relevancy score calculated for the at least one learner responses, and/or the upper bound may be the highest total relevancy score calculated for the at least one learner responses. Finally, the method may include sorting the at least one assessed responses by one of the total relevancy score, a timestamp, a number of identified keywords, and a number of identified keyphrases, and/or filtering the at least one assessed responses by at least one of a word, a keyword, a keyphrase, a content type, and a tier.

According to another aspect of the disclosure, a computer-implemented method of assessing depth-of-understanding may include receiving, by an assessor server, a target response associated with a question, the target response comprising a target response text, the target response text comprising at least one of a word, a keyword, and a keyphrase, and receiving, by the assessor server, at least one learner response associated with the question. Each of the at least one learner response may be received through a network from a different learner client device and comprising a learner response text and an identifier. The method may also include normalizing, with a processor of the assessor server, the learner response text of each of the at least one learner response, normalizing, with the processor, the target response text, and calculating, with the processor, a total relevancy score for each of the at least one learner responses by determining a relevancy score with respect to each word, keyword, and keyphrase in the target response text and in light of all learner responses and summing all relevancy scores determined for each learner response. The method may include defining, with the processor, a plurality of tiers by partitioning a relevancy score range having an upper bound and a lower bound into a plurality of subset ranges. Each tier of the plurality of tiers may describe one of the plurality of subset ranges. Finally, the method may include assigning, with the processor, each of the at least one learner responses to one of the plurality of tiers based upon which of the plurality of subset ranges contains the total relevancy score of the learner response. The assignment of each of the at least one learner response to one of the plurality of tiers may be substantially concurrent with the receipt of the at least one learner response.

According to yet another aspect of the disclosure, a system for assessing depth-of-understanding may include a facilitator client device, a plurality of learner client devices, and an assessor server communicatively coupled to the facilitator client device and the plurality of learner client devices through a network. The assessor server may include a processor and a memory, and is configured to associate a token with a lesson data comprising a question, receive the token from each of the plurality of learner client devices, and receive a target response associated with a question. The target response may include a target response text, the target response text comprising at least one of a word, a keyword, and a keyphrase. The assessor server may also be configured to receive at least one learner response associated with the question. Each of the at least one learner response may be received through the network from one of the plurality of learner client devices and includes a learner response text and an identifier. The assessor server may also be configured to normalize the learner response text of each of the at least one learner response, normalize the target response text, and calculate a total relevancy score for each of the at least one learner responses by determining a relevancy score with respect to each word, keyword, and keyphrase in the target response text and in light of all learner responses and summing all relevancy scores determined for each learner response. The assessor server may also be further configured to define, with the processor, a plurality of tiers by partitioning a relevancy score range having an upper bound and a lower bound into a plurality of subset ranges. Each tier of the plurality of tiers may describe one of the plurality of subset ranges. Finally, the assessor server may be configured to assign, with the processor, each of the at least one learner responses to one of the plurality of tiers based upon which of the plurality of subset ranges contains the total relevancy score of the learner response, and send to the facilitator client device, concurrent with the lesson data, an assessed response for each of the at least one learner responses. The assessed response may include one of the at least one learner responses and the associated total relevancy score and assigned tier. The assignment of each of the at least one learner response to one of the plurality of tiers may be substantially concurrent with the receipt of the at least one learner response.

Particular embodiments may comprise one or more of the following features. The system may further include a board client device. The assessor server may be further configured to receive the token from the board client device and may send the question to at least one of the plurality of learner client devices and the board client device. The relevancy score with respect to each word, keyword, and keyphrase in the target response text may be determined using a term frequency/inverse document frequency (TF/IDF) weighting. The target response text may include at least one keyword or keyphrase and/or the target response may include a weight associated with each of the at least one keyword or keyphrase. Calculating the total relevancy score may further include multiplying any relevancy score determined with respect to each of the at least one keyword or keyphrase by the associated weight before the relevancy scores are summed for each of the at least one learner responses.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure is hereinafter described in conjunction with the appended drawings, where like designations denote like elements, and.

DETAILED DESCRIPTION

Figure 1A:
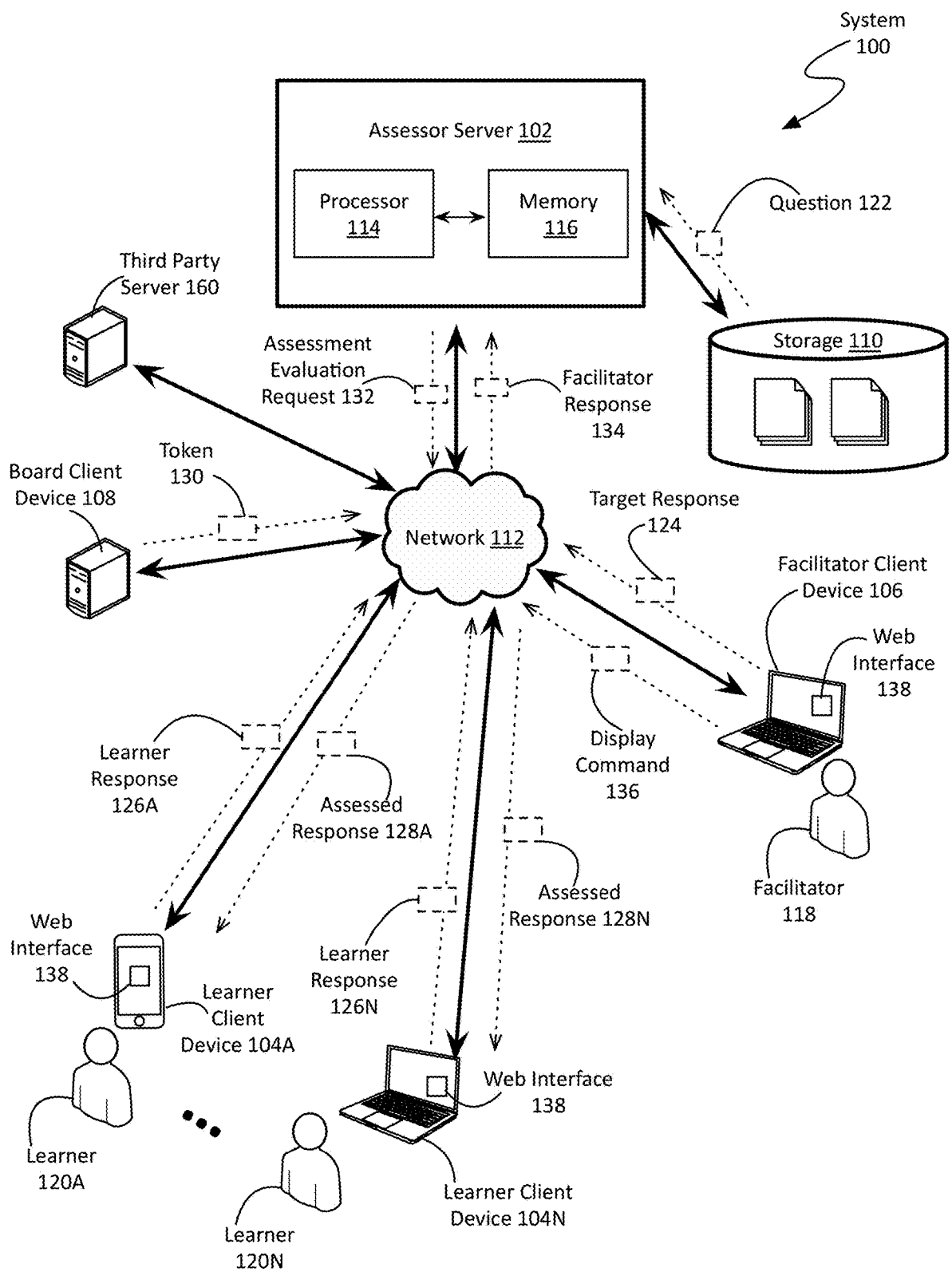
FIG. 1A shows a network configuration view of a system for assessing depth-of-understanding.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

FIG. 1A is a network configuration view of a non-limiting example of a system for assessing depth-of-understanding among a body of learners, or students. In the context of the present description and the claims that follow, depth-of-understanding refers to a measure of an individual's grasp of a particular concept, topic, or fact. The teaching process is most effective when the teacher is able to determine how a particular concept is being received. Traditionally, a teacher could pose a question to the class, whether orally or written, such as on a blackboard, and wait for a volunteer to answer, such as a student or two willing to speak in front of their peers. However, a reluctance to speak out in class does not indicate a lack of understanding, and such a polling method is slow, and may be feasible for measuring the understanding of a few students. Teachers could also use a test or quiz to gauge the depth-of-understanding of the class as a whole, or engage in one-on-one (1:1) oral examination. However, grading a test or interacting on a 1:1 environment is time consuming; and a discussion or classroom lecture may be long over by the time a teacher can see the test results.

Conventional electronic or computer-based methods for assessing knowledge have made it possible to quickly receive feedback from an entire class in response to a question in much shorter amount of time, making it feasible to query and receive responses from and entire class, even when a class size is greater than a few students. Since the feedback can be made anonymous, participation can be more likely. Additionally, the responses can be quickly assessed for basic accuracy. However, increased speed has been made possible by requiring the questions posed to the class to be in a particular form with limited response options, such as multiple choice or true/false questions. While such simple questions are easy to grade, they may only test a superficial understanding without providing a very accurate measure of depth-of-understanding. Multiple choice questions can prompt the student with the correct answer they otherwise would not have remembered, and random guesses can be indistinguishable from a response coming from a deep mastery of the subject.

Furthermore, conventional electronic solutions may be costly, ranging from about $2,500-$5,000 (USD) depending on how the system is setup and the class size, and can additionally include costs for maintenance and replacement of broken equipment. Furthermore, such systems often require a lot of training and configuration up and running. Preparing a series of meaningful multiple choice questions can be time consuming; if the alternative choices are not chosen carefully, the question will not reveal much about the level of comprehension of the students.

As shown, system 100 may comprise an assessor server 102 coupled to a storage 110 and able to communicate with one or more facilitators 118, learners 120, and board client devices 108, according to various embodiments. Advantageous over the prior art, system 100 may be used to assess depth-of-understanding based upon free response questions. As has been recognized by the science of psychology, correctly answering free response questions (as opposed to multiple choice questions) requires a greater level of knowledge and recall, or depth-of-understanding or depth-of-learning. Free response questions are a better measure of depth-of-learning because randomly guessing a correct response is made more difficult, and a correct response being triggered or remembered by a suggested response is eliminated. Instead of measuring a binary right or wrong response, relevancy measured by the current system is more nuanced, and has the ability to track comprehension and learning in much more nuanced ways. Measurement not only of the individual free response answer, but how one free response answer compares to a group or collection of other free response answers may guide a teacher in how to adjust their presentation to better accomplish their goals.

By providing quick and near instantaneous assessment of the depth-of-understanding of learner responses 126 that are provided in a free response format, a facilitator 118 has a powerful tool to assist them in understanding the level of their audience's comprehension at various points during class discussions, such as at a beginning, during, or at the end. Implementation of the disclosed system can also achieve improved results from a fundamentally different approach than conventional electronic or computer-based methods. Instead of requiring a careful selection of incorrect answers among which to hide the best choice for a multiple-choice question, a facilitator 118 may focus on a question and answer in direct conversational language. Rather than spending time developing deceptive answers with which s to trick their students, a facilitator 118 is free to focus on the material they wish their learners 120 to truly understand by the end of a lesson.

Furthermore, learners 120 can also submit questions in an anonymous way that they might be otherwise too embarrassed to ask in front of a larger group. Additionally, the relevance assessment system 100 described herein can operate as a stand-alone system or can be integrated with other software programs, and include other features, systems, and programs.

Furthermore, rather than searching a group of free-response answers for patterns and making comparisons among different answers or determining clusters, topics, themes, or patterns within or among answers, for presenting a sample or small number of representative responses to a facilitator for a human-generated assessment of depth-of-understanding, the present system automatically makes the assessment for relevance based on facilitator defined criteria, such as keywords and keyphrases, and returns results based on the assessed relevance of the learner responses in a form that can be easily understood and quickly apprehended by the facilitator. Although the clustering approach may result in less work than would be required to grade a test in the traditional manner, the clustering approach still requires a teacher to evaluate the representative samples, which would likely slow or bring a class discussion to a halt. The disclosed system 100 actually performs a heuristic evaluation of the depth-of-understanding. As such, the assessed learner responses are presented in real-time or near real-time and with a relevancy attached, which can be advantageous for discussion, synthesis, and gauging or measuring depth-of-understanding for both individual learners and groups or classes of learners, while minimizing or reducing the flow of a lesson, including facilitator-learner discussion.

As used herein, the system 100 for accessing learner response relevance or depth-of-understanding is referred to, for convenience, as one or more of a "relevance assessment system," "assessment system," "educational system," "response system," or "system." The assessment system 100 described herein is not limited to educational applications, learning environments, or classroom settings, but can apply to polling and other information or data collection systems, for assessment of information in various field or areas including commercial, political, governmental, defense, scientific, humanitarian, artistic, and other endeavors.

Many additional components and assembly procedures known in the art consistent with information collection, processing, and arranging will become apparent for use with implementations of the relevance assessment system described in this disclosure. Accordingly, for example, although particular features are disclosed, such interfaces, methods, and implementing components may comprise any shape, size, style, type, model, version, measurement, concentration, material, quantity, and/or the like as is known in the art for such systems and implementing components, consistent with the intended operation, including use of, or implementation with, existing devices, such as laptops, smartphones, and tablets, that can operate over the internet, with Bluetooth, wired, wirelessly, over a closed circuit systems, or as part of any suitable network or system as described in greater detail below.

Thus, it should be understood that although particular embodiments disclosed herein may relate to education, system 100 may be applied to any type of interactive system for collecting, aggregating, measuring, scoring, comparing, processing, or displaying information collected or obtained, in which information is assessed for relevance or depth-of-understanding.

The assessment system 100 described herein allows for a plurality of inputs, such as learner or student responses to a facilitator or teacher question, to be assessed for relevancy. Relevancy, which is discussed in greater detail below, can be understood at least in part as an abbreviated term for the concept of learner depth-of-understanding. As such, relevancy is more than a binary classification of correct or incorrect answers, but is rather a floating-point number of score, and exists and can be measured along a continuum or gradient. Therefore, relevancy is not limited to, or measured only by, a format of multiple choice questions as has been done in conventional automated response systems, but instead may be measured with respect to free response answers.

Assessment, as used herein, and as described in greater detail below, is a human-friendly, user-friendly, and/or facilitator-friendly gauge that summarizes depth-of-understanding or relevancy as it relates to a current question or question posed by a facilitator to one or more learners, such as during a facilitator learner lesson.

As shown in FIG. 1A, the system 100 includes an assessor server 102, which comprises a processor 114 and a memory 116. In some embodiments, server 102 may be a single device, while in other embodiments, server 100 may represent multiple devices working in concert, or a virtual machine running in a shared or distributed environment. Interactions with the assessor server 102 may be direct, or may be through an API, according to various embodiments. The server 102 mediates communication between other system components, and also performs the assessment of learner's depth-of-understanding.

As shown, the assessor server 102 is communicatively coupled to a storage 110. In some embodiments, the storage 110 may be a separate device networked with the assessor server 102, while in other embodiments the storage 110 may be a component local to, or even internal to, server 102.

The assessor server 102 is communicatively coupled through a network 112 (e.g. LAN, internet, etc.) to a facilitator device 106 associated with a facilitator 118, a plurality of learner client devices 104A-N each associated with a learner 120, a board client device 108, and a third-party server 160, according to various embodiments. As used herein, a facilitator 118 is one or more individuals, teacher, instructors, presenters, or other entities charged with interacting with a plurality of learners. In the context of the present description, a learner 120 is a student, participant, audience member, or any other individual receiving information from a facilitator.

A facilitator client device 106 may be a desktop, laptop, mobile device, or other network enabled device that may interact with the assessor server 102. In some embodiments, said interactions are performed through a web interface, which may be advantageous as many or most devices are capable of displaying a web page. A learner client device 104A may also refer to a desktop, laptop, mobile device, or other device (e.g. smart TV, game console, etc.) capable of interacting with the server 102 over the network 112. In some embodiments, the assessor server 102 and the facilitator client device 106 may be the same device.

A board client device 108 may be a computing device for sharing moderated content that includes a display element and is capable of interacting with the server 102 through the network 112. In some embodiments, the board client device 108 may include a display element large enough to reach a number of learners 120, such as a projector in a lecture hall. Like the facilitator and learner client devices, the board client device may interact with the assessor server 102 through a web interface. The board client device 108 may be local to the facilitator client device 106 (e.g. in the same room), or it may be remote (e.g. projecting at a satellite location for remote learning, etc.).

Advantageous over conventional systems, interacting with the facilitator client device 106, learner client devices 104, and board client device 108 through a web interface means that the system 100 may be implemented using equipment owned by the facilitator, their institution, and their learners. Additionally, engaging the learners through their personal devices may improve focus in the classroom (e.g., they are interacting with the facilitator rather than computer applications (apps) or each other). The facilitator client device 106, learner client devices 104, and/or board client device 108 may be associated with, or obtain access to, the assessor server 102 by sending a token 130, as will be discussed in greater detail below. In other embodiments, interactions may be accomplished through interfaces other than the web, including but not limited to, task-specific applications, chat protocols, email, and/or any other communications method known in the art.

As shown, the facilitator client device 106 may be used to send a target response 124 (e.g. a model answer, etc.) to the server 102. The target response data 124 will be discussed in greater detail with respect to FIG. 2. As will be discussed in greater detail with respect to FIG. 1B, the facilitator client device 106 may also be used to provide class and lesson data. Furthermore, the facilitator 118 may send a display command 136 via the facilitator client device 106, which in turn causes the server 102 to display specified content (e.g. question, response, relevancy assessment, media, etc.) through a web interface on the board client device 108 and/or learner client devices 104.

The learners 120 may be provided with a question 122 through their devices, or through the board client device 108. The learners may then respond to the question freely, rather than selecting one from a limited number of answers (though multiple choice and true/false questions could also be implemented). The free response is sent from the learner client devices 104 as a learner response 126 to the assessor server 102. Using a process that will be discussed in greater detail later, the responses are scored for relevancy. The assessed responses 128 are then returned to the learner client devices 104, as well as the facilitator client device 106. In some embodiments, the assessment may involve information obtained from a third-party server 160. Based upon the assessment, the facilitator 118 may choose to adjust their lesson plan (e.g. revisiting misunderstood topics, moving faster through topics well-understood, etc.). After the assessment, the assessor server 102 may present the facilitator 118 with an assessment evaluation request 132, who may respond with a facilitator response 134. Such an evaluation, and how the results may be used to refine the assessment process, are discussed in greater detail with respect to FIG. 15.

Figure 1B:
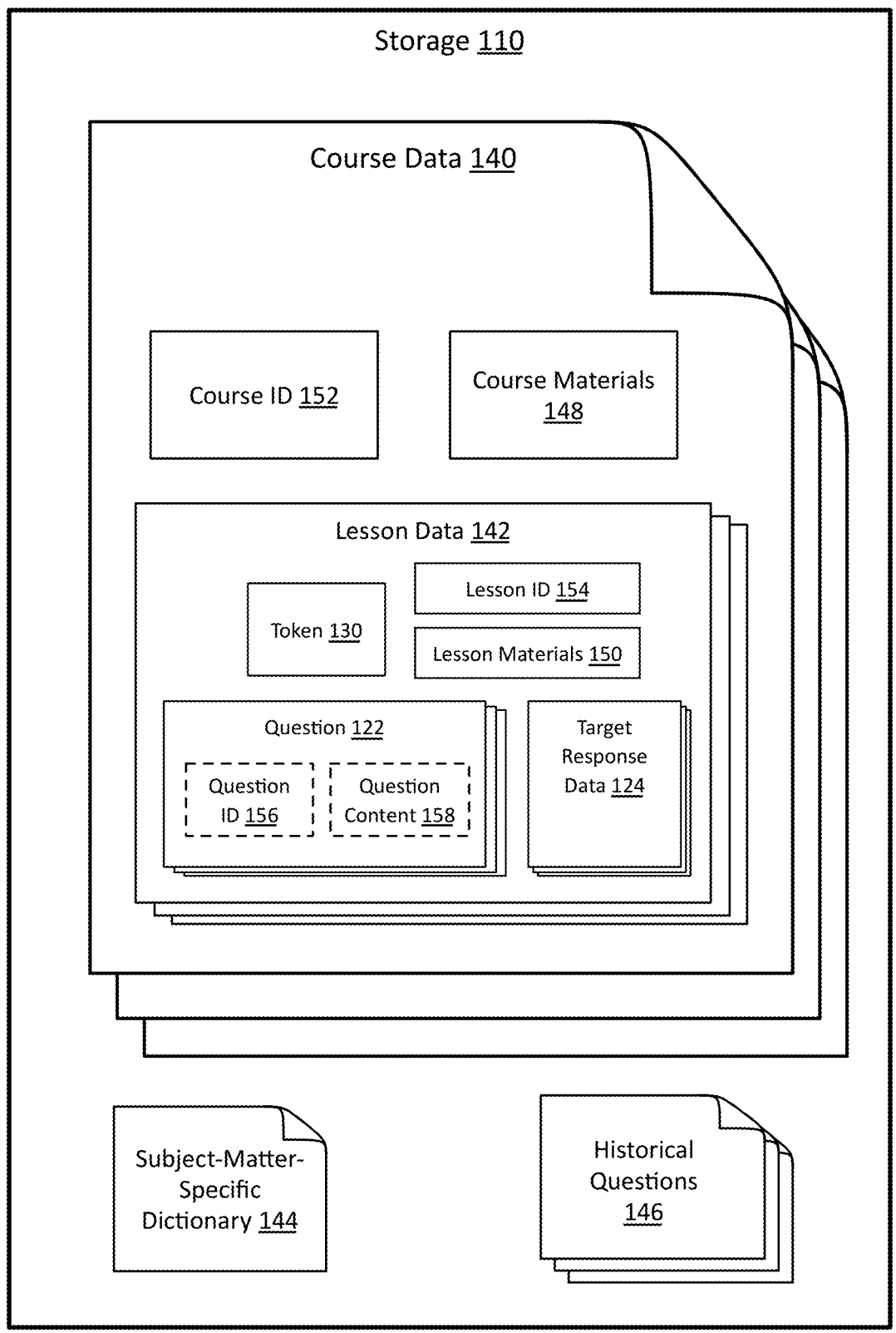
FIG. 1B shows a schematic view of the storage of FIG. 1.

FIG. 1B is a schematic view of the storage 110 of FIG. 1, according to various embodiments. As shown, the storage 110 may comprise a collection of course data 140. In the context of the present description, a course may refer to an educational class, course, or conference, which can include one or more sessions. A lesson refers to a session or subdivision of a course, such as a lecture, presentation, class period, lab, meeting, breakout session, or the like, that can recur and fixed or varied intervals. A lesson may be composed of a number of questions 122 used to engage the learners 120 (e.g. students) and gauge their level of understanding. Questions may be prepared ahead of time, pulled from a storage 110 or third-party server 160, or added to a lesson as it is occurring. Questions 122 may include free response questions, as well as limited response questions such as multiple choice and true/false.

A course can be in person with a shared physical space, either localized with all parties meeting in person or face to face, or distribute, with smaller subgroups or satellite groups meeting in person or face to face. The course can also be in a virtual space or virtual classroom, including separate, distinct, or remote physically spaces with one or more students interacting through video, audio, text, or other communication medium.

As shown in FIG. 1B, course data 140 may be a data structure that contains the parameters for a course. It may comprise a collection of lesson data 142, as well as course materials 148 (e.g. syllabus, text book, handouts, slides, dictionaries, reference material, links to third party information, etc.) that may be used by the server 102 to enhance the assessment results, as will be discussed in greater detail below. The course data 140 may also include a course ID 152, which may be used to identify a specific course, and associated lessons, questions, facilitators, and the like.

Lesson data 142 may be a data structure that contains parameters and resources for a particular lesson, according to various embodiments. A lesson data 142 may comprise a plurality of questions 122 and associated target response data 124 (which will be discussed with respect to FIG. 2), a lesson ID 154 that uniquely identifies a lesson, lesson materials 150 specific to a particular lesson, and a token 130 used to associate client devices with the ongoing lesson when the lesson data 142 is put into use or initialized. In some embodiments, the token 130 may be generated by the server 102 or facilitator client device 106, while in others the token may be specified by the facilitator 118 at the time the lesson is being presented. As a specific example, a token 130 may be a 5-character alphanumeric strain, or any other suitable strain.

As shown, a question 122 may comprise a question ID 156 and a question content 158. A question content 158 may be in a variety of formats, including but not limited to text, video, sound, and images. According to some embodiments, the assessment of learner responses 126 does not require processing of the question 122 that was asked, thus freeing the facilitator 118 to employ any form of question they feel will best engage the learners, or would best streamline the preparation process. In other embodiments, the assessor server 102 may analyze the question content 158 to enhance the assessment process by finding additional keywords and keyphrases, narrowing the extrapolation of words, finding correct spellings, and/or suggesting additional questions on the same topic. As a specific example, the facilitator may be prompted with additional, automatically obtained or generated questions related to the question just asked, which they can present at the press of a button if additional assessment or discussion is warranted.

The question ID 156 is an identifier (e.g. alphanumeric string, etc.) unique to a question. According to various embodiments, the question ID 156, lesson ID 154, and course ID 152 may be linked. As a specific example, a question ID 156 may contain the lesson ID 154 of the lesson data 142 in which it is used, and a lesson ID 142 may contain the course ID 152 in which it is found. Discussion of course data 140, lesson data 142 inside the course data 140, and question data 122 inside the lesson data 142 may be literal (e.g. they are all stored together, etc.) or referential (e.g. the lesson data 142 comprises links or linking information such as a question ID 156 to question data 122 stored elsewhere). Referential storage may facilitate the recycling of prepared lessons and questions, which may be applicable to other courses and lessons. As an option, course data 140, lesson data 142, and question data 122 may further include additional metadata describing the subject matter, previous learner reception (e.g. generated a lot of discussion, got a big laugh, exposed a common misunderstanding, etc.), related subjects, and the like.

Additional implementation parameters or defaults may be specified in course data, lesson data, or question data 122. Such parameters may include, but are not limited to, whether there is a time limit for learners to respond to a question 122 and what it is, whether a learner can change their answer to a question with resubmission, and the like.

As shown, storage 110 may also comprise a subject-matter-specific dictionary 144, which refers to a collection of words (and possibly definitions, in some embodiments using machine learning) specific to a particular set of subject matter. The application of such dictionaries 144 will be discussed in greater detail with respect to normalization and extrapolation of text. Furthermore, storage 110 may comprise a plurality of historical questions 146, which may be used to suggest possible questions to a facilitator 118 while they are preparing a lesson 142. Historical questions 146 may further include associated responses, scoring criteria, and other metadata.

Figure 2:
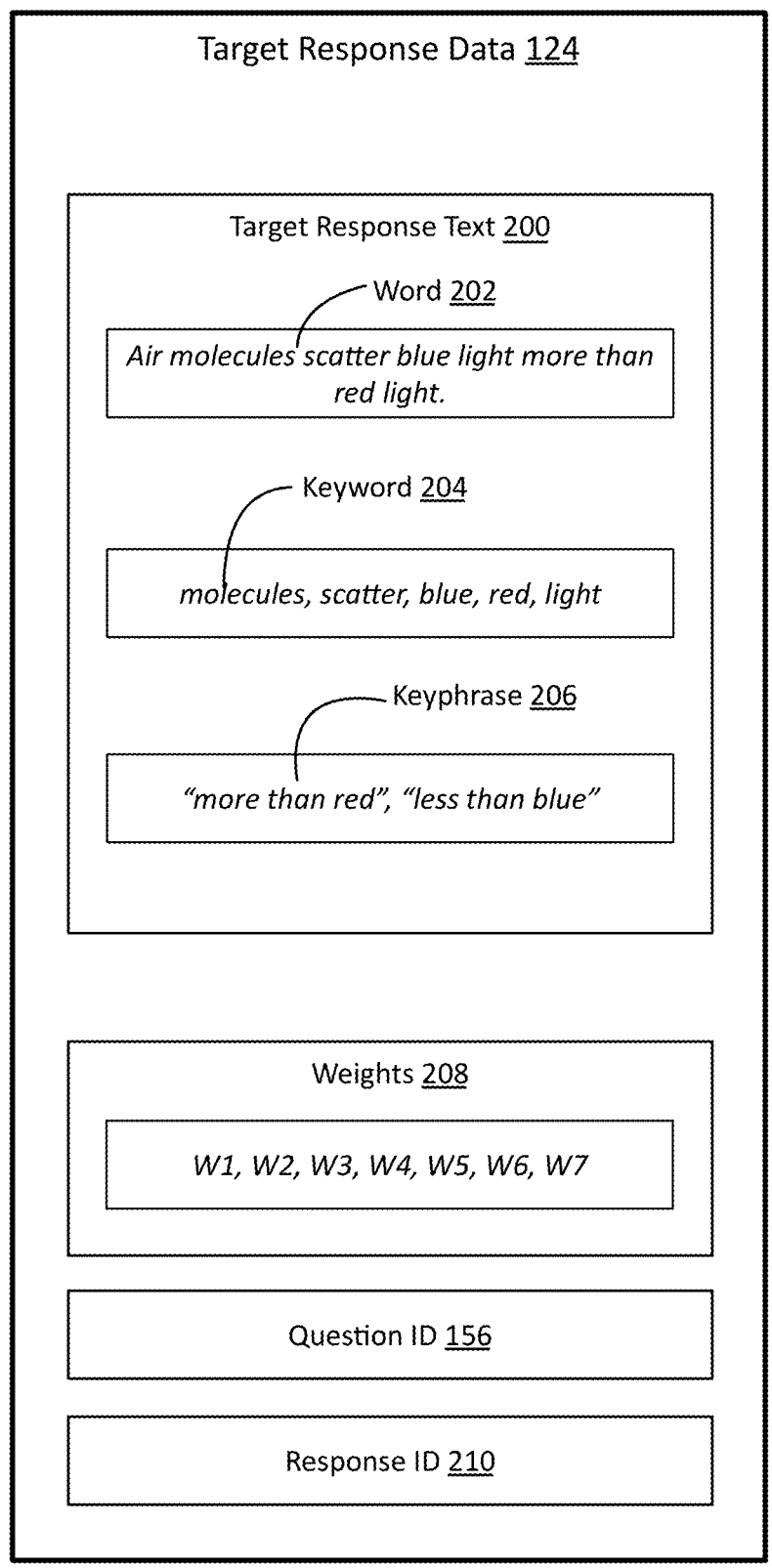
FIG. 2 shows a schematic view of a target response data.

FIG. 2 is a schematic view of a target response data 124, according to various embodiments. As should be clear to one skilled in the art, the elements shown within the target response data 124 (and other data objects herein) may be grouped literally (e.g. physically stored near each other, etc.) or referentially (e.g. target response data 124 comprises links to other elements within a relational database, etc.). The target response data 124 may be thought of as describing an idealized response to a particular question 122. In some embodiments, the target response data 124 may be provided by a facilitator 118, while in others it may be, at least partially, obtained automatically by the server 102 using machine learning applied to historical questions 146 and responses, course materials 148, lesson materials 150, and content found in third party servers 160.

As shown, the target response data 124 comprises a target response text 200, and may also comprise weights 208, a question ID 156 associated with the question 122 being answered, and a response ID 210 unique to this particular target response 124. In some embodiments, storage 110 may comprise multiple target responses 124 associated (e.g. containing the question ID of) a single question 122, as well as evaluation data which may be used to improve aspects of the assessment. The use of evaluations will be discussed in greater detail with respect to FIG. 15.

The target response text 200 may comprise a collection of words 202 (e.g. "Air molecules scatter blue light more than red light", one or more keywords 204 (e.g. "molecules, scatter, blue, red, light"), and/or a collection of keyphrases 206 (e.g. "more than red", "less than blue"). The ability to receive a free response text answer is advantageous, as it makes it easier for a facilitator 118 to prepare a question. For example, only a model answer is needed for system 100, rather than a correct answer choice plus a few choices that are close but not correct, as required by conventional systems.

Keywords 204 and keyphrases 206 are embodiments of core ideas being assessed by a particular question and should be found in the best answers. According to some embodiments, each keyword 204 and keyphrase 206 is associated with a weight, which may elevate (or demote, for negative weights) a relevancy score.

According to various embodiments, the system 100 may employ a binary weighting system in which each keyword 204 or keyphrase 206 is assigned a value of "more" ("+") or "less" ("−") so that keywords 204 with a "less" tag will have a standard weighting or value assigned, and keywords 204 or keyphrases 206 with a "more" tag will be have a higher weighting or value assigned than the standard "less" value. In some embodiments, more granular weighting may be employed, with more variation among weights; however the use of a toggle to indicate standard (less) weight or additional (more) weight, has been found to provide a good balance of ease of use and level of detail for assessing relevancy and presenting the assessment in a way that can be easily and quickly digested and used by the facilitator 118.

Figure 3:
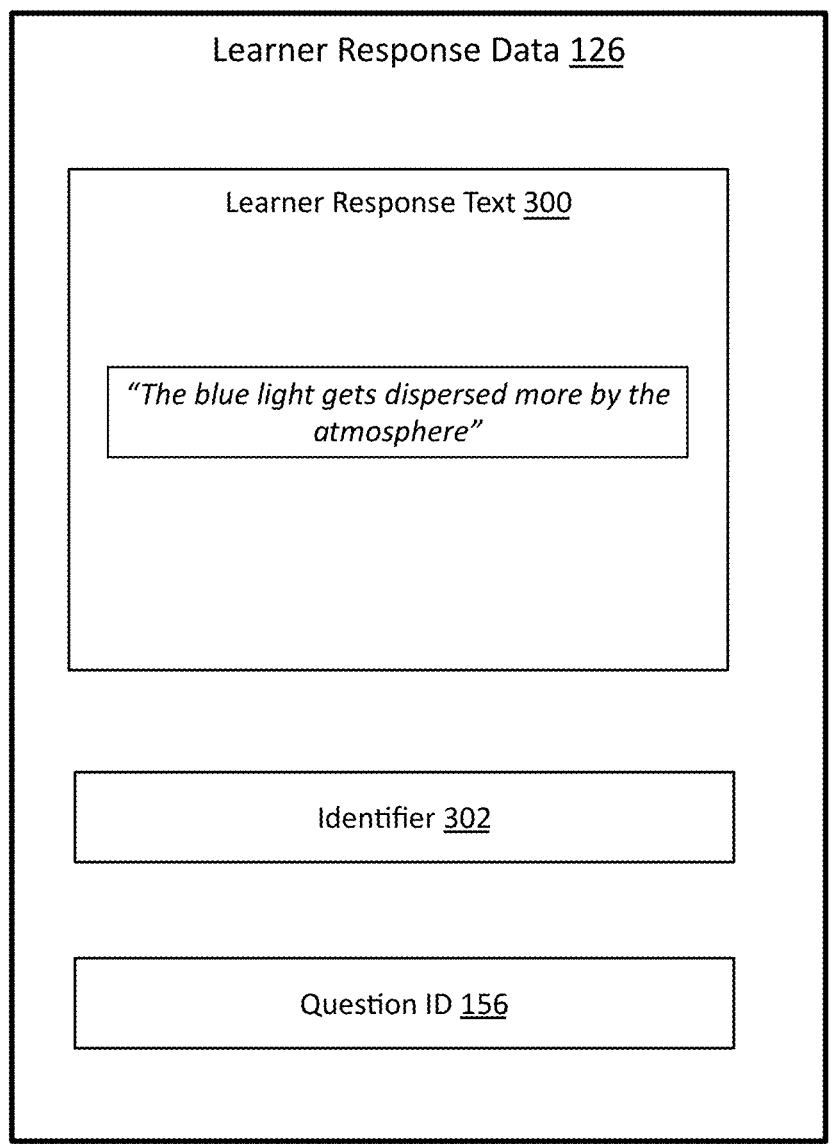
FIG. 3 shows a schematic view of a learner response data.

FIG. 3 is a schematic view of a learner response data 126, according to various embodiments. The learner response data 126 contains a learner's 120 answer to a question 122, and comprises a learner response text 300 (e.g. "The blue light gets dispersed more by the atmosphere"). As previously discussed, a learner response text 300 may be a free response (e.g. one or more sentences, conversational response), which is advantageous over the multiple-choice format used in conventional systems as it is a better test of a learner's depth-of-understanding. The learner response data 126 may also comprise a question ID 156 specifying the question 122 being answered, as well as an identifier 302. The identifier 302 is unique to either the learner 120 (e.g. name, username, assigned string, chosen identifier, student number, etc.) or their learner client device 104 (e.g. MAC address, serial number, alphanumeric code, etc.).

It should be noted that in some instances, the assessment of depth-of-learning may be performed statelessly. As used herein, statelessly means that the response can be computed with a stateless protocol, or a communications protocol that treats each request as an independent transaction that is unrelated to any previous request so that the communication consists of independent pairs of request and response. The stateless protocol does not require the server 102 to retain session information or status about each communications partner (e.g. board client device 108, learner client device 104, facilitator client device 106) for the duration of multiple requests; which is in contrast, to a stateful protocol, or a protocol which requires keeping of the internal state on the server 102. Stateless assessment allows information, like learner responses 126, to not be submitted in a particular form, state, condition, or format, but can be submitted, and then processed, without regard for the way in which the information was submitted. In some embodiments, the stateless protocol may be implemented by the inclusion of additional information in the response data objects received and sent by the assessor server 102 (e.g. token 130, a unique ID associated with a device, individual, or data object, etc.).

Figure 4:
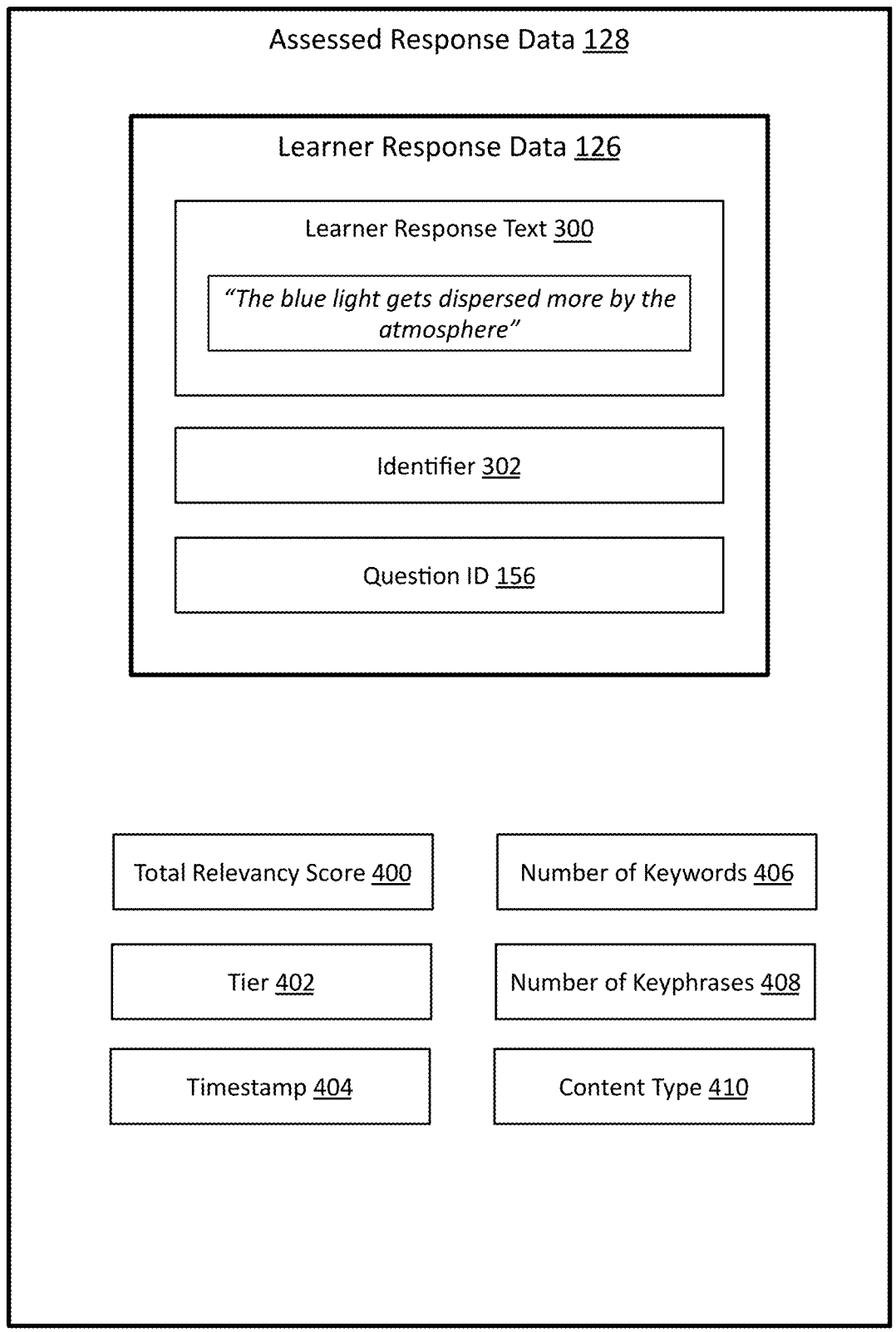
FIG. 4 shows a schematic view of an assessed response data.

FIG. 4 is a schematic view of an assessed response data 128, according to various embodiments. The assessed response data 128 contains a learner's response and the results of being assessed by the assessor server 102. As shown, the assessed response data 128 comprises a learner response data 126, as previously described, as well as assessment results. According to various embodiments, the assessment results may include a total relevancy score 400, a tier 402, a timestamp 404 of when the response was submitted by the learner, a number of keywords 406 found in the learner response text 300, a number of keyphrases 408 found in the learner response text 300, and a content type 410. The assessment results may later serve as a basis for sorting and/or filtering the assessed responses on the facilitator client device 106.

The total relevancy score 400 is a number which serves as a heuristic for the depth-of-understanding represented by the learner response text 300, and will be discussed in greater detail with respect to FIG. 5A. The tier 402 indicates one of a discrete number of levels representing the range of depth-of-understanding observed within a body of learners 120. Tiers 402 will be discussed in greater detail with respect to FIG. 5B and FIG. 10. Content type 410 may be used to indicate some aspect of the learner response text 300 deemed to be of interest, and observable by the assessor server 102. As a specific example, content type 410 of an assessed response data 128 may indicate whether the learner response text 300 contains a previously specified word or words inappropriate for the class, which may facilitate filtering such responses from display on the board client device 108.

Figure 5A:
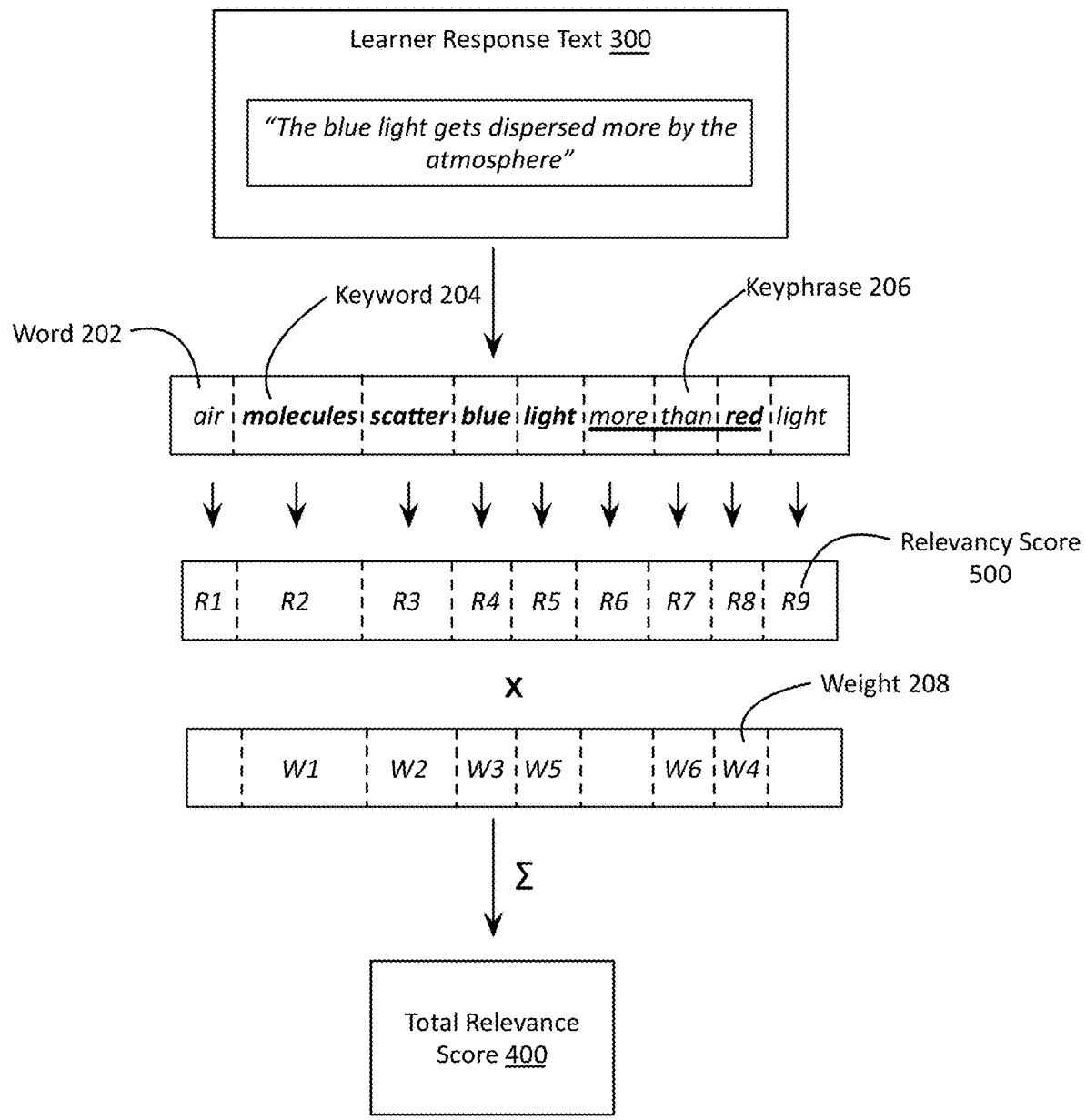
FIG. 5A shows a representation of a method of assigning a total relevance score.

FIG. 5A is a representation of a method for assigning a total relevance score 400. According to various embodiments, a total relevance score 400 is based on the relevancy score 500 of a learner response text 300 (e.g. "The blue light gets dispersed more by the atmosphere") in light of each word 202 (e.g. "air", etc.), keyword 204 (e.g. "molecules", etc.), and keyphrase 206 (e.g. "more than red", etc.) of a target response text 200 (e.g. "air molecules scatter blue light more than red light". In some embodiments, the relevancy score 500 may be obtained using a term frequency/inverse document frequency (TF/IDF) weighting, as will be discussed in greater detail with respect to FIG. 11. As an option, a learner response text 300 may be broken down into n-tuples for determining whether a keyphrase 206 is present in the response.

As shown, the relevancy scores 500 determined for each keyword 204 and keyphrase 206 may be multiplied by an associated weight 208 (e.g. W1, W2, etc.). The resulting relevancy scores 500 are summed, resulting in a total relevance score 400.

Figure 5B:
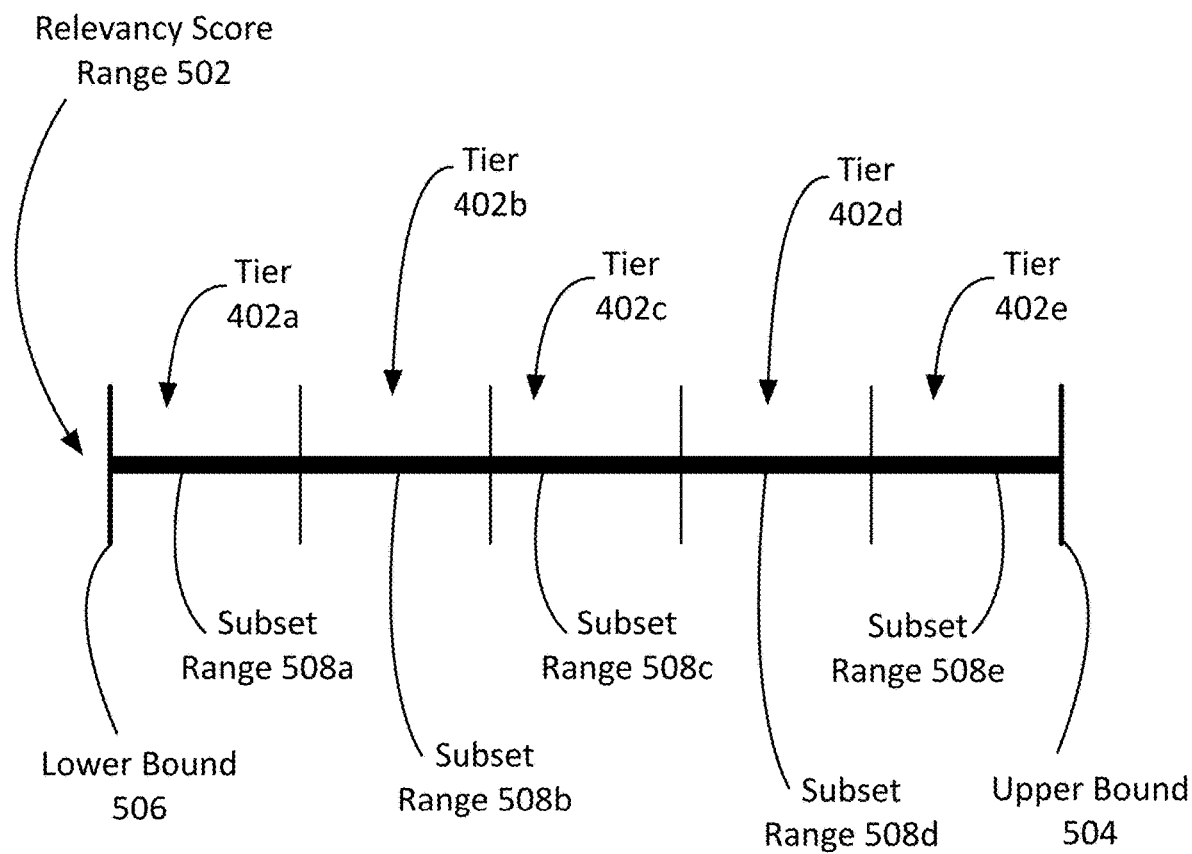
FIG. 5B shows a schematic view of a plurality of tiers.

FIG. 5B is a schematic view of a plurality of tiers 402 representing levels of understanding. Rather than presenting a raw score to a facilitator 118, each learner response 126 may be assigned to a tier 402, which enumerate a level or band of understanding. According to various embodiments, the plurality of tiers 402 is defined by partitioning the range 502 of total relevance scores 400 determined for all responses received so far for a particular question 122. The range 502 has an upper bound 504 and a lower bound 506, and is broken into a plurality of subset ranges 508. Each of the subset ranges 508 is associated with an enumerated tier 402; the assessed responses are assigned a tier 402 based upon which subset range 508 contains their total relevance score 400.

In some embodiments, the lower bound 506 may be defined as the lowest total relevance score 400 assessed for the current body of learners. In other embodiments, the lower bound 506 may be set to zero, and represent the score obtained when a learner response does not contain any keywords or keyphrases. In some instances, incorrect words (trick answers) can be included as keywords having negative weight, that will subtract value from a score so that a negative value can be set as the lower bound of the relevancy score range 502. Intermediate assessment ranges can also be standardized or predetermined between the upper 504 and lower 506 bound, or can be custom generated based on the custom or individualized responses provided by the learners 120.

In some embodiments, the upper bound 504 is defined as the highest assessed total relevance score 400 among the body of learner responses 126. In other embodiments, the upper bound 504 may be defined as the total relevance score 400 generated by the target response text 200; as an option, the scoring may be performed just for a free response portion of the target response text 200.

The tiers 402 assigned to each response can be an enumerated 5-step rating, or a rating comprising any other number of steps, such as three, four, six, seven, ten, or any other number of suitable steps. When 5-steps are used, the higher the number ratings can represent a more relevant response, with 1 being the least relevant, and 5 being the most relevant, although the order could also be switched. As such, a 5-step rating could be organized as: 1. Irrelevant, 2. Somewhat Relevant, 3. Relevant, 4. Very Relevant, 5. Outstandingly Relevant. In some instances, a graphical representation can also be employed showing relevance visually, such as with color, shading, patterns, icons, or other graphical feature. While a rating system of any number of desirable steps may be possible, a rating system comprising 5-steps has been found to provide a good balance of specificity and simplicity.

Figure 6:
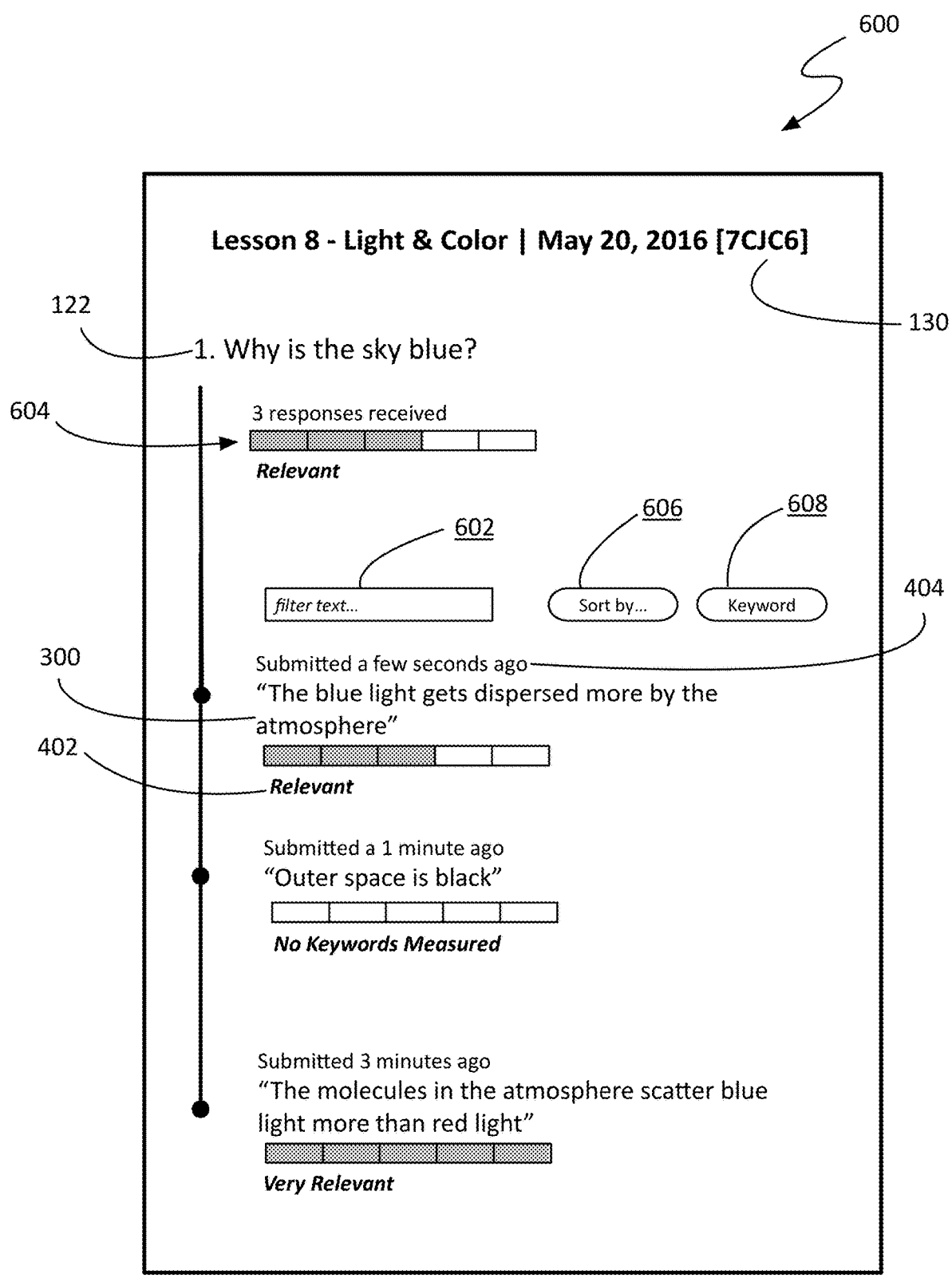
FIG. 6 shows a user interface for a facilitator client device.

FIG. 6 illustrates an exemplary user interface for a facilitator client device, displaying the results of an assessment, according to various embodiments. Said interface may be provided to the facilitator client device 106 through a web interface, an application, or any other format. As shown, the user interface 600 may contain the lesson token 130, the current question 122, and a response assessment summary 604. A response assessment summary 604 may summarize the assessed depth-of-learning for all responses received thus far, and may include the number of responses, a graphical (e.g. 3 boxes out of 5) and/or enumerated (e.g. "relevant") representation of the average tier 402 assignment or total relevance score 400. In other embodiments, additional statistics and information may be included in the response assessment summary 604, including but not limited to a plot of all total relevancy scores 400 (e.g. to make modes more obvious, etc.), and a standard deviation (e.g. fractions of tiers, relevancy score points, etc.).

As shown, facilitator user interface 600 also comprises the assessed response data 128 for the three responses received thus far. Each includes a timestamp 404, the learner response text 300, and the assigned tier 402.

For ease of review, understanding, and tracking, the order of the assessed responses seen by the facilitator 118 in user interface 600 can remain unchanged, or can be sorted. See, for example, the "Sort by . . . " drop-down menu 606, which may allow the assessed responses to be sorted, ascending or descending, by a variety of criteria, including but not limited to, timestamp 404 (i.e. sorted in order or receipt), time between question and submission, total relevance score 400, tier 402, number of keywords 406, number of keyphrases 408, and any other recorded data. In some instances, a facilitator 118 can select a preferred answer, even one containing words different than the keywords. In other instances, learners can vote for what response they like best, and the responses can be ranked, ordered, or presented based on learner feedback.

In some embodiments, assessed results may be filtered in the facilitator user interface 600. For example, filter text field 602 may allow a facilitator 118 to limit the displayed responses to those containing a particular text string. Such a filtering may be performed for specific keywords and keyphrases using the "Keyword" drop-down menu 608, which may list all keywords and keyphrases, along with the number of responses they are each found in.

To protect privacy or confidentiality of responses, in some instances the identifier of a given response will be available only internally within the system 100 so that the facilitator 118 does not know which response is associated with its particular learner 120. In other instances, a facilitator 118 or other third party can know the identifier and associate particular responses and scores or relevancies with particular learners 120.

Though not shown in user interface 600, the system 100 may also allow the facilitator 118 to see who is connected to the system 100, who has responded to questions 122, and to collect and track statistics. Also, user interface 600 may also include elements to assist in sharing information through learner or board client devices. For example, in some embodiments, each assessed response shown in the interface 600 may be accompanied by icons. One icon may cause the response to be shown on the board client device 108. Another icon may allow the facilitator to send a custom or "canned" message to the learner client device 104 associated with the response (e.g. "nice job", "see me after class", etc.). As an option, a facilitator 118 may send a message or question to the devices of all learners who are in a particular tier 402 (e.g. "Do you want me to spend more time on this?", etc.).

Additionally, the facilitator client device 106 may receive a lesson summary report at the end of a lesson, which may indicate terms that generated the largest split in depth-of-understanding scores, as well as terms that seemed to get confused or transposed, which may aid in planning future lessons or reviews.

Figure 7:
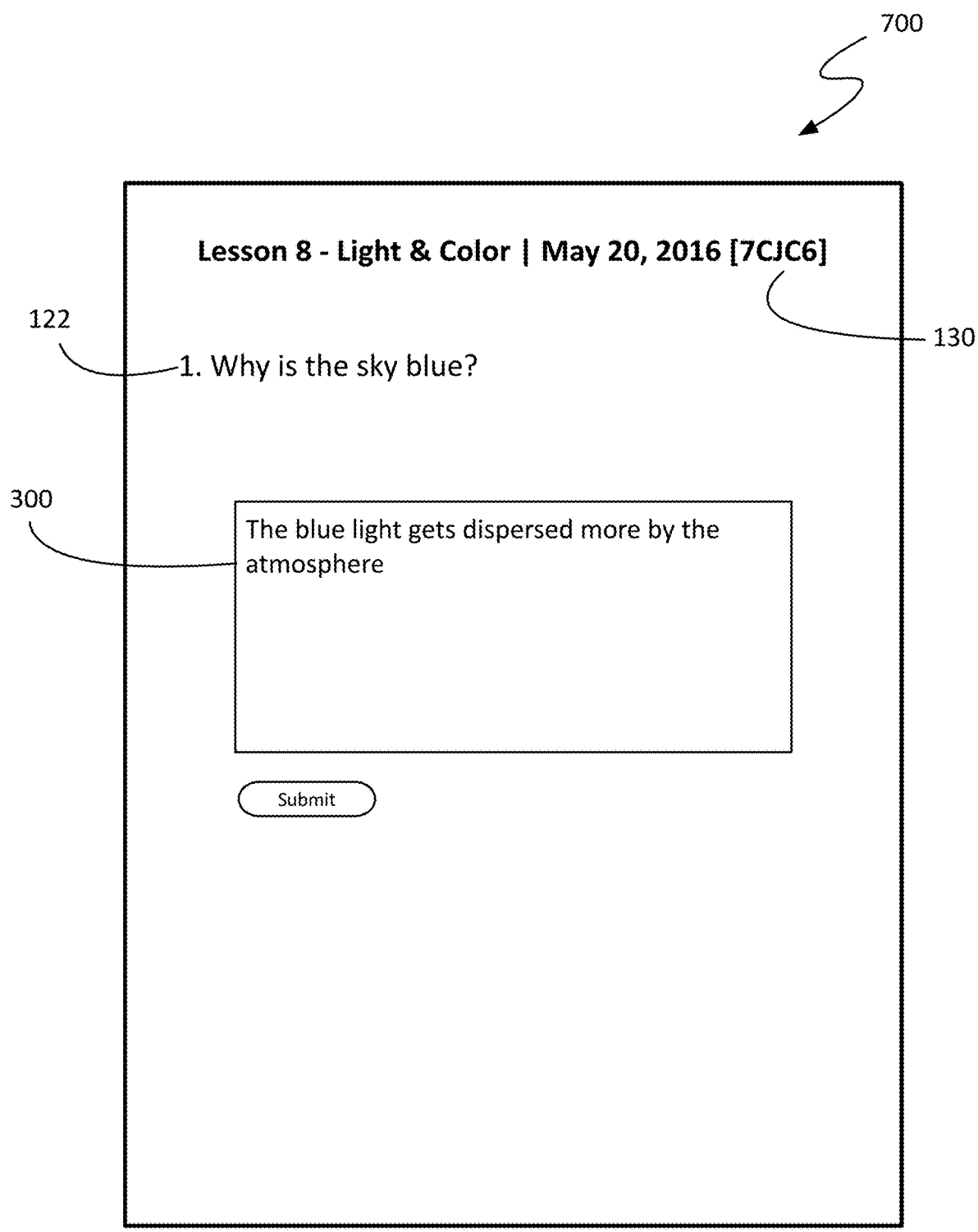
FIG. 7 shows an example of a user interface for a learner client device.

FIG. 7 illustrates an exemplary user interface 700 for a learner client device, prompting the learner 120 for a free response to a question 122, according to various embodiments. As shown, the interface 700 comprises the question 122 being asked, the lesson token 130, and a field for receiving the learner's learner response text 300. As an option, the question 122 being displayed may be text, an image, a video, or a sound. In some embodiments, the interface 700 may also comprise a timer (e.g. time left to answer the question, etc.), and may also show a previous response and assessed tier in situations where learners are allowed to submit multiple responses.

Figure 8:
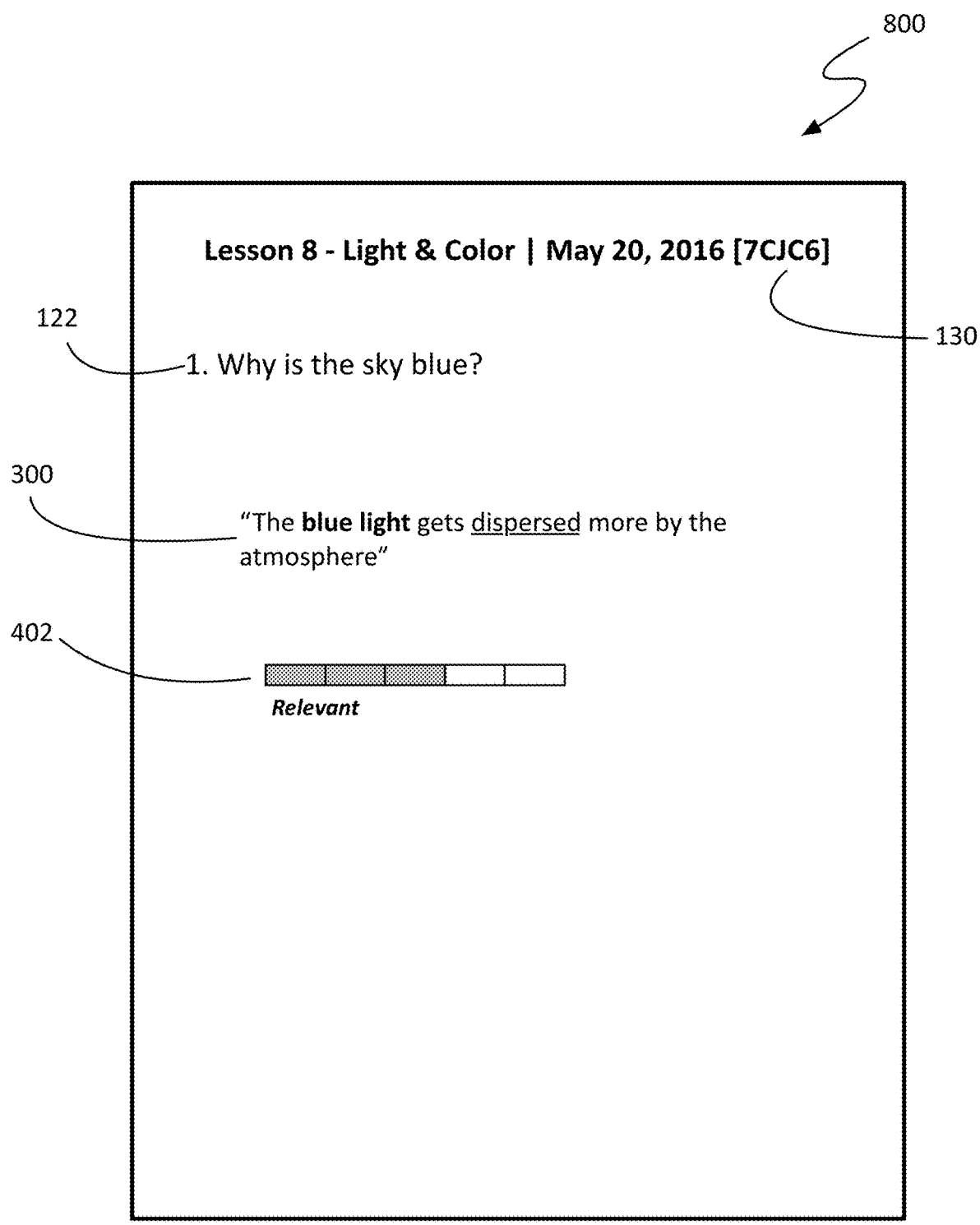
FIG. 8 shows an example of a user interface for a board client device.

FIG. 8 illustrates an exemplary user interface 800 for a board client device, displaying a question 122 and a selected response text 300 and assessed tier 402. According to various embodiments, the facilitator 118 may use their client device 106 to send the learner response text of an assessed response 128, a response assessment summary 604, and at least part of the target response text 200 (e.g. list of keywords, keyphrases, model free response answer, etc.), by sending a display command 136 to the assessor server 102.

The facilitator 118 can act as a moderator by filtering or choosing which learner responses 126 and what information is shared through the board client device 108 and through the displays being viewed by the learners 120. For example, the facilitator can choose to share all, part, or a desired portion of the grouped or assessed responses on or with the board client device 108. When answers are shared with the board client device 108, all or part of the learners 120 can see the displayed grouped and assessed responses on the one or more displays. By sharing information on the board client device 108, the learners 120 can see how their individual answers compare with a model or "correct" answer, and can additionally compare their answer to other learner's answers. In an instance where the facilitator 118 wants to brainstorm, or not moderate answers, a facilitator client device interface can be shown through the board client device 108, which may then be used to display unmoderated responses from the learners as they are received.

Figure 9:
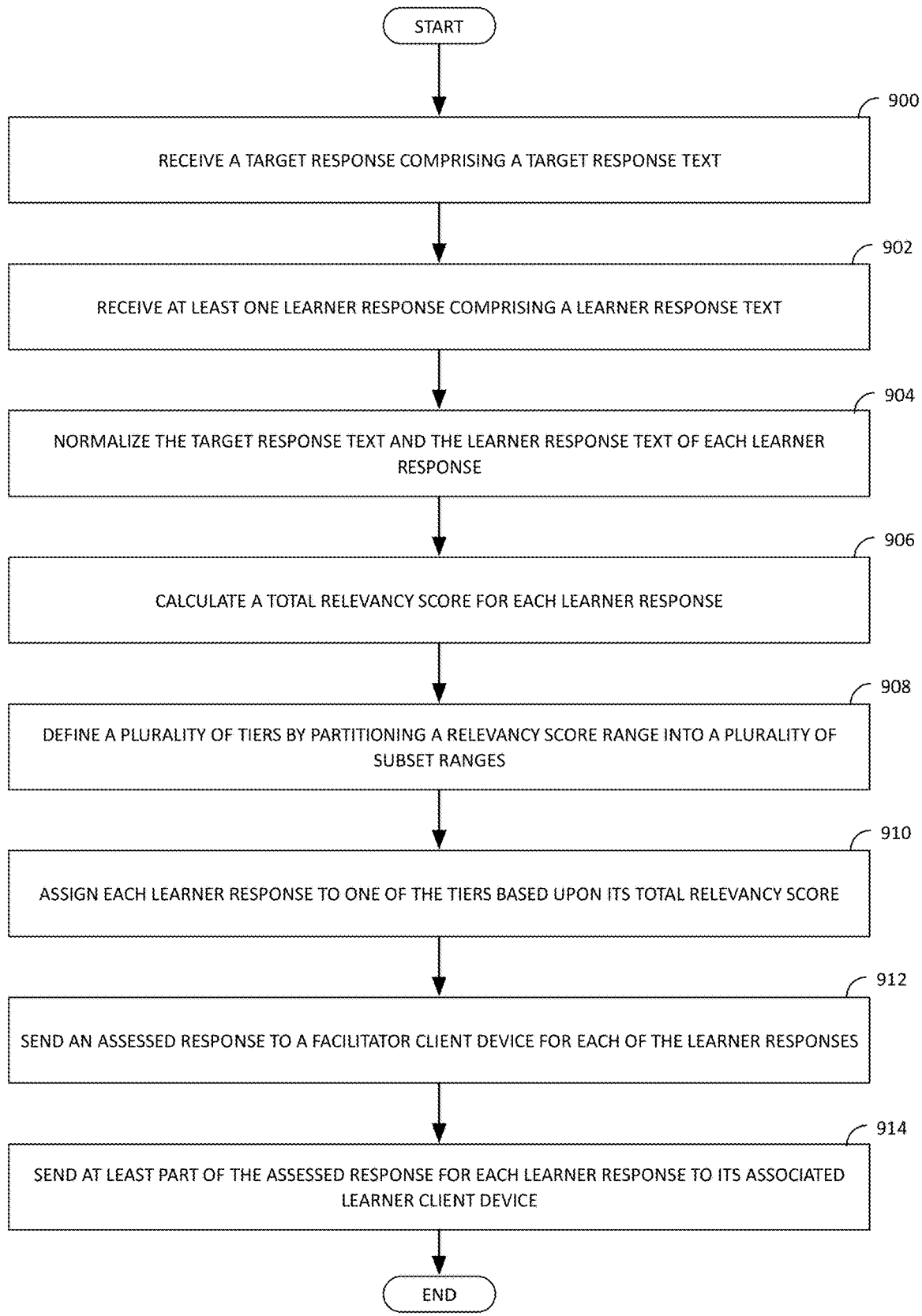
FIG. 9 shows a flow diagram showing an example of an assessor server's process for assessing a depth-of-understanding.

FIG. 9 is a flow diagram showing the assessor server's process for assessing a depth-of-understanding, according to various embodiments. As shown, the process includes receiving, by the assessor server 102, a target response data 124 associated with a question 122 and comprising a target response text 200. See, e.g., element 900. As previously discussed, the target response text 200 may comprise at least one of a word 202 (e.g. a free response model answer to the question, etc.), a keyword 204, and a keyphrase 206. The keyword(s) 204 and/or keyphrase(s) 206 may be accompanied by associated weights 208, according to various embodiments.

The process also includes receiving, at the server 102, at least one learner response 126 associated with the question 122 and comprising a learner response text 300 and an identifier 302. See, e.g., element 902. Each learner response 126 may be received through a network 112 from a learner client device 104 associated with a learner 120.

According to various embodiments, the process may include normalizing the target response text 200 and the learner response text 300 of each learner response 126. See, e.g., element 904. A process for normalizing response text will be discussed in greater detail with respect to FIG. 12. The process further includes calculating a total relevancy score 400 for each learner response 126. See, e.g., element 906. A process for calculating a total relevancy score 400 will be discussed in greater detail with respect to FIG. 11.

As shown, the process also includes defining a plurality of tiers 402 by partitioning a relevancy score range 502 having an upper bound 504 and a lower bound 506 into a plurality of subset ranges 508, wherein each tier 402 describes one of the plurality of subset ranges 508. See, e.g., element 908. Next, the process includes assigning each learner response 126 to one of the tiers 402 based upon which of the plurality of subset ranges 508 contains the total relevancy score 400 of the learner response 126. See, e.g., element 910, as well as FIG. 5B.

According to some embodiments, the process further includes sending an assessed response 128 to a facilitator client device 106 for each of the learner responses 126. See, e.g., element 912. As previously discussed, an assessed response 128 may comprise a learner response 126 and an associated total relevancy score 400 and assigned tier 402.

Finally, the process may include sending at least part of the assessed response 128 for each learner response 126 to its associated learner client device 104. See, e.g., element 914. According to various embodiments, the associated learner client device 104 may be identified through the identifier 302 of the learner response 126.

According to various embodiments, the assignment of a learner response 126 to one of the plurality of tiers 402 is substantially concurrent with the receipt of said learner response 126 by the assessor server 102. In the context of the present description and the claims that follow, substantially concurrent means that the receipt and subsequent assignment occur within a short period of time, on the order of seconds, or a fraction of a second. In embodiments where the calculation of a total relevancy score involves an analysis across the entire body of responses received (e.g. TF/IDF, etc.), the overhead of the body-wide analysis may increase as the number of learners increases. Such overhead may be on the order of seconds or a fraction of a second for a traditional class or lecture hall, or even when employed with a distributed group of learners (e.g. an online course with thousands of participants, etc.).

Obtaining the assessed learner responses substantially concurrent with their receipt is advantageous, as the facilitator may immediately see a gauge of the class's understanding while the topic is still fresh, or even still being discussed. As a specific example, a facilitator may use a rapidly returned collection of assessed responses to decide whether to move on to another topic, or whether the subject matter of the posed question needs to be discussed further.

Figure 10:
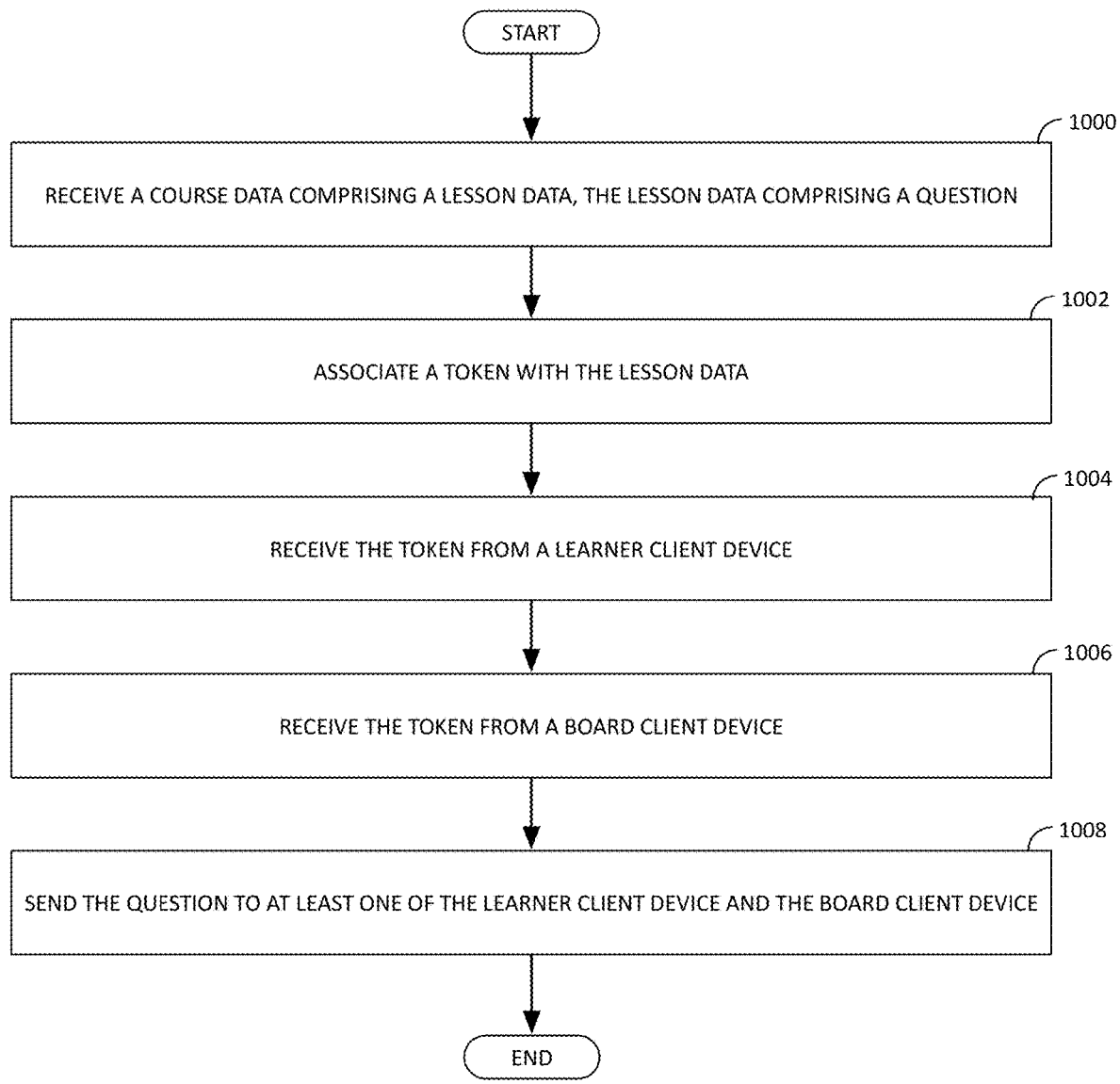
FIG. 10 shows a flow diagram showing an example of an assessor server's process for initiating a lesson.

FIG. 10 is a flow diagram showing the assessor server 102 process for initiating a lesson. As shown, the process includes the assessor server 102 receiving a course data 140, the course data 140 comprising one or more lesson data 142, each lesson data 142 comprising one or more questions 122. See, e.g., element 1000. In some embodiments, the course data 140, lesson data 142, and/or questions 122 may be provided by a facilitator 118, either through a facilitator client device 106 or through another communication method, such as email or through a different web portal or application. In other embodiments, some or all of the course, lesson, and/or question data may be obtained from storage 110 or a third-party server 160, having been previously prepared by other individuals or collected using machine learning.

Next, the process includes associating a token 130 with the lesson data 142. See, e.g., element 1002. In some embodiments, the token 130 may be chosen by a facilitator 118, while in other embodiments, the token 130 may be automatically generated by one of the assessor server 102 and the facilitator client device 106.

The process also includes receiving the token 130 from a learner client device 104. See, e.g., element 1004. The learner 120 is able to join the lesson, receive questions and other data, and submit responses for assessment, through their client device after sending the token 130 to the assessor server 102. Additionally, the process may include receiving, by the assessor server 102, the token 130 from a board client device 108. See, e.g., element 1006. After identifying itself as a board, the board client device 102 may be used to display various information, questions, selected responses, and other data elected by the facilitator and/or learners.

Lastly, the process includes sending a question 122 to at least one of the learner client device 104. See, e.g., element 1008. The question may also be sent to the board client device 108, according to various embodiments.

According to various embodiments, the facilitator client device, the learner client devices, and the board client device may all operate through a web interface, which may be advantageous due to the wide variety of devices capable of showing a web interface. In other embodiments, one or more of these clients may communicate with the assessor server 102 through a different format, such as an application, or any other method or protocol known in the art.

Figure 11:
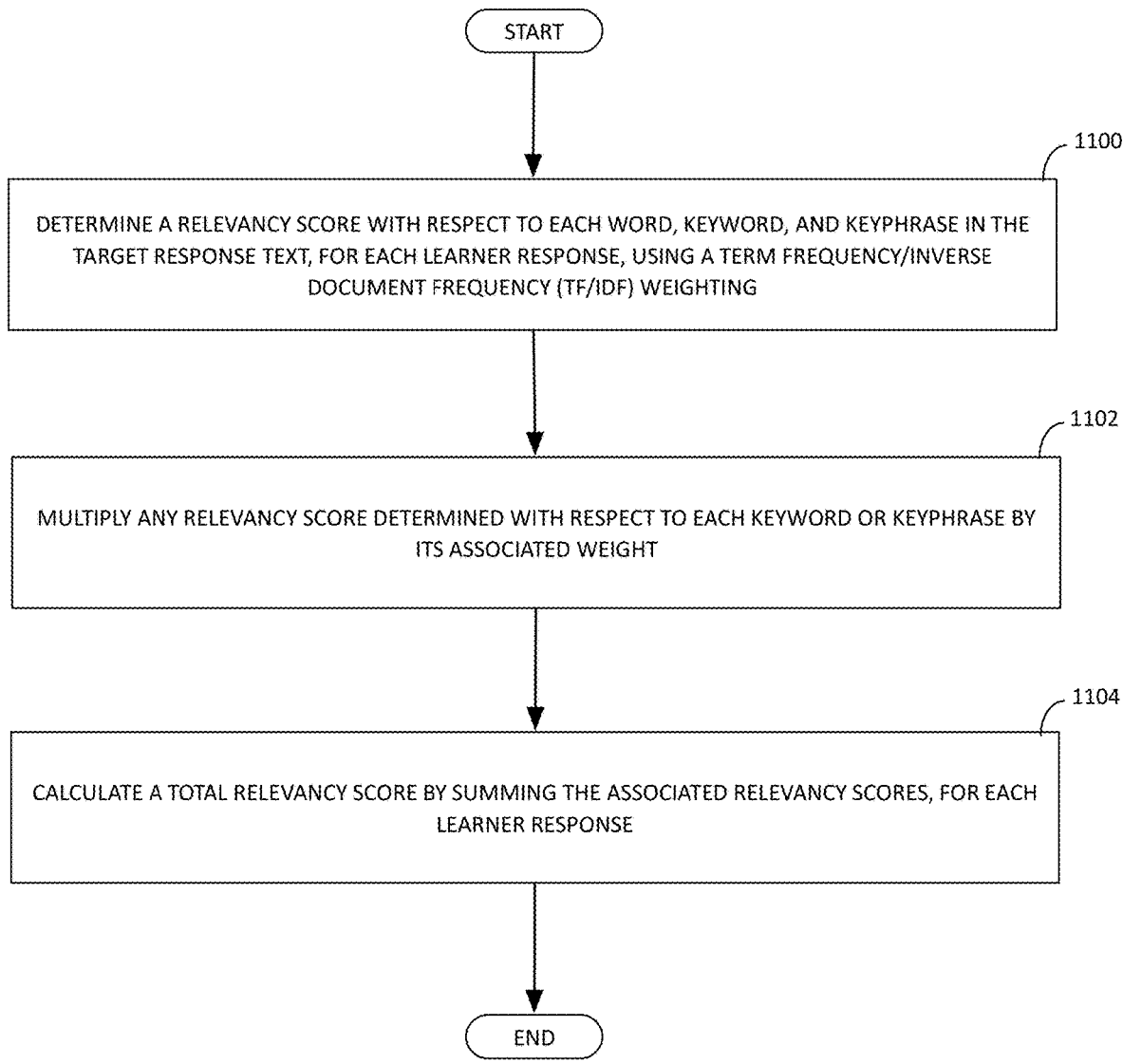
FIG. 11 shows a flow diagram showing an example of an assessor server's process for assigning a total relevance score.

FIG. 11 is a flow diagram showing the assessor server 102 process for assigning a total relevance score 400, according to various embodiments. As shown, the process includes determining a relevancy score 500 with respect to each word 202, keyword 204, and keyphrase 206 in the target response text 200, for each learner response 126, as depicted in FIG. 5A. See, e.g., element 1100. According to various embodiments, the relevancy score 500 may be determined by weighting the importance of a term in a response, based on the statistics of occurrence of the term among all responses. As a specific example, some embodiments may employ term frequency/inverse document frequency (TF/IDF) weighting, which tempers the repeated use of a term within a response by how unique its use is across all responses. According to various embodiments, variants of TF/IDF may be employed, as should be clear to one skilled in the art. For example, a sublinear scaling of term frequency (TF) may be used to avoid rewarding overly verbose responses. Other examples of variants include, but are not limited to, maximum TF normalization or smoothing, probabilistic inverse document frequency weighting, and any others known in the art. Additional examples are provided in "Introduction to Information Retrieval", by Christopher D. Manning, Prabhakar Raghavan, and Hinrich Schütze, published by Cambridge University Press, ISBN 0521865719, and incorporated by reference herein, in its entirety.

As shown, the process further includes multiplying any relevancy score 500 determined with respect to each keyword 204 or keyphrase 206 by an associated weight 208. See, e.g., element 1102, as well as FIG. 5A and associated discussion. In some embodiments, one or more weights may be negative, such that their appearance in a learner response 126 would reduce the total relevancy score 400. Such a weighting may be used in "trick questions", or to more clearly determine whether learners are confusing two similar but very distinct terms (e.g. false cognates in a foreign language, phonetically similar terms, commonly misused terms, etc.).

In some embodiments, a relevancy score 500 is determined with respect to each keyword 204 and keyphrase 206 in addition to evaluation of each word 202 in the response text, in essence amplifying their weight. In other embodiments, the associated weight is multiplied with the relevancy score 500 for the word or words that are also keywords and keyphrases.

Finally, the process includes calculating a total relevancy score 400 by summing the associated relevancy scores 500, for each learner response 126. See, e.g., element 1104. In some embodiments, an additional weighting may be applied to a total relevancy score 400 that may be based upon aspects unrelated to the content of the response. For example, in an embodiment, the total relevancy score 400 may be weighted according to the amount of time elapsed between the question 122 being sent to the learner client devices 104 and the response being received. With such a weighting, one response may be given a higher score than another response that is identical in content, but required twice as much time for the learner to formulate. All other things (such as content) being equal, a faster response may indicate a greater mastery of the subject matter; such a weighting could reflect such mastery.

Figure 12:
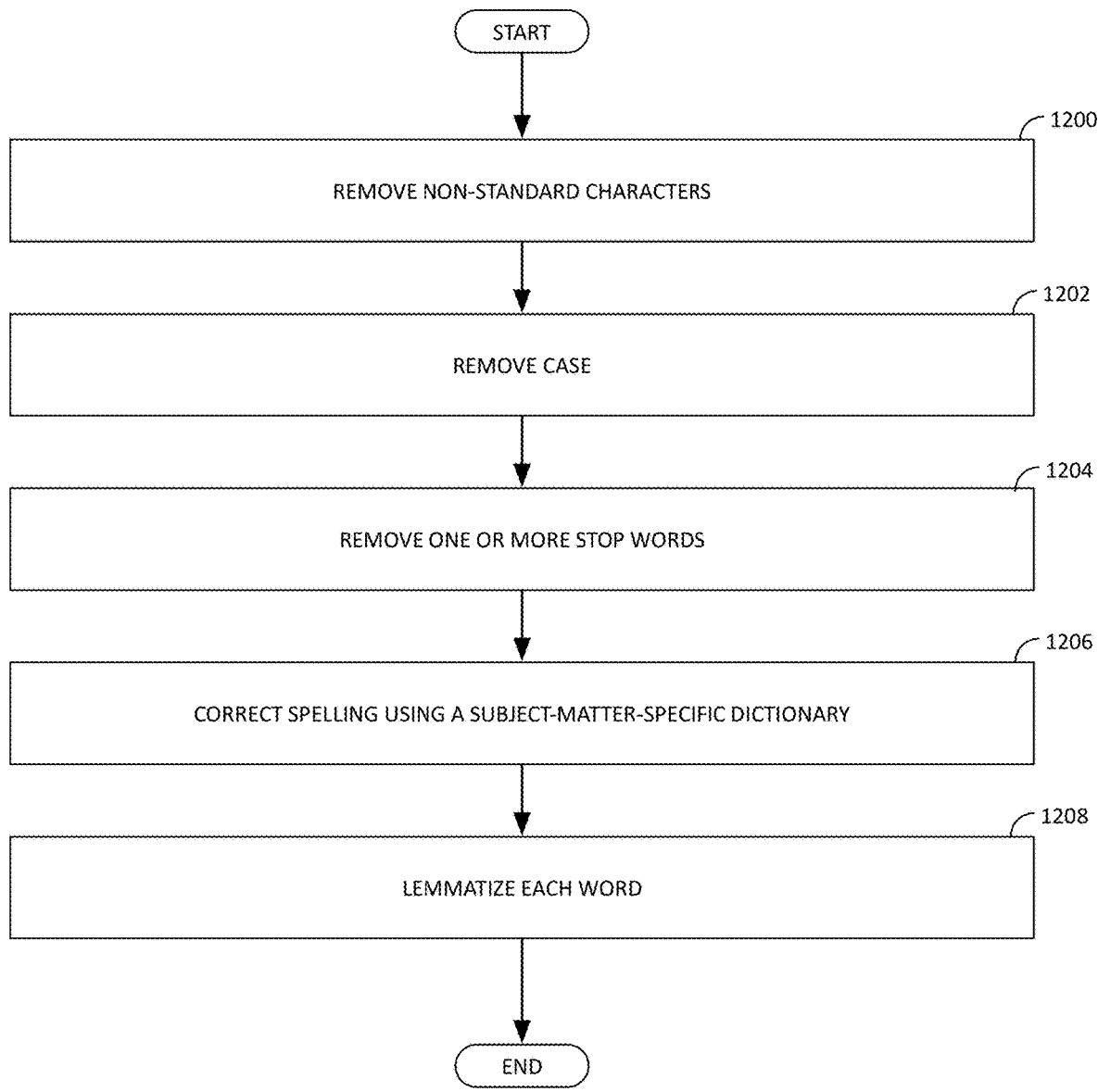
FIG. 12 shows a flow diagram showing an example of an assessor server's process for normalization of response text.

FIG. 12 is a flow diagram showing the assessor server's process for normalization of response text, according to various embodiments. Normalization is the preparation of text for relevance analysis. As shown, the process includes removing non-standard characters. See, e.g., element 1200. Non-standard characters can include or be any character that is not a letter (a-z) or a number (0-9). The process also includes removing case, or converting all text to a single case (See, e.g., element 1202) as well as removing one or more stop words (See, e.g., element 1204). As is well known in the art of information processing and retrieval, stop-words may include, but are not limited to, "e.g.", "i.e.", "and", "the", "a", "an", and "etc".

According to various embodiments, the process may also include correcting spelling using a subject-matter-specific dictionary. See, e.g., element 1206. As used herein, a subject-matter-specific dictionary may refer to a collection of words associated with a particular subject, or a particular facet of a subject. By using a narrow dictionary, misspelled words in the response (or correct words that appear to be misspelled commonplace words) may be corrected, such that a learner's assessed depth-of-understanding isn't marred by a poor spelling ability. In some embodiments, spelling correction may also include substitution of words for common abbreviations (e.g. "text speak", etc.) as well as emoji. Finally, the process includes lemmatizing each word. See, e.g., element 1208. Lemmatizing means converting each word to its base or root conjugation, so different variations of a word will be scored equivalently.

According to various embodiments, the normalized text of a target response 124 may be further extrapolated to expand the effectiveness of the assessment. For example, in some embodiments, the assessor server 102 may automatically add additional keywords and keyphrases based upon the target response text 200 based upon a statistical or intelligent analysis of a body of materials including but not limited to dictionaries, previously used questions and responses, materials associated with a course (e.g. syllabus, handouts, tests, textbooks, etc.), and materials associated with a lesson (e.g. handouts, slides, lecture notes, etc.). In some embodiments, a facilitator 118 may specify one or more words that should not be extrapolated (e.g. specific vocabulary that is at the heart of a lesson, etc.). In some embodiments, weights may also be automatically assigned to the extrapolated words. For example, an extrapolated word may be given a lower weight than the root from which it came. In some embodiments, extrapolated words may be automatically given weights based upon the weight given to the root (e.g. negative weights propagate to extrapolated words, etc.).

Figure 13:
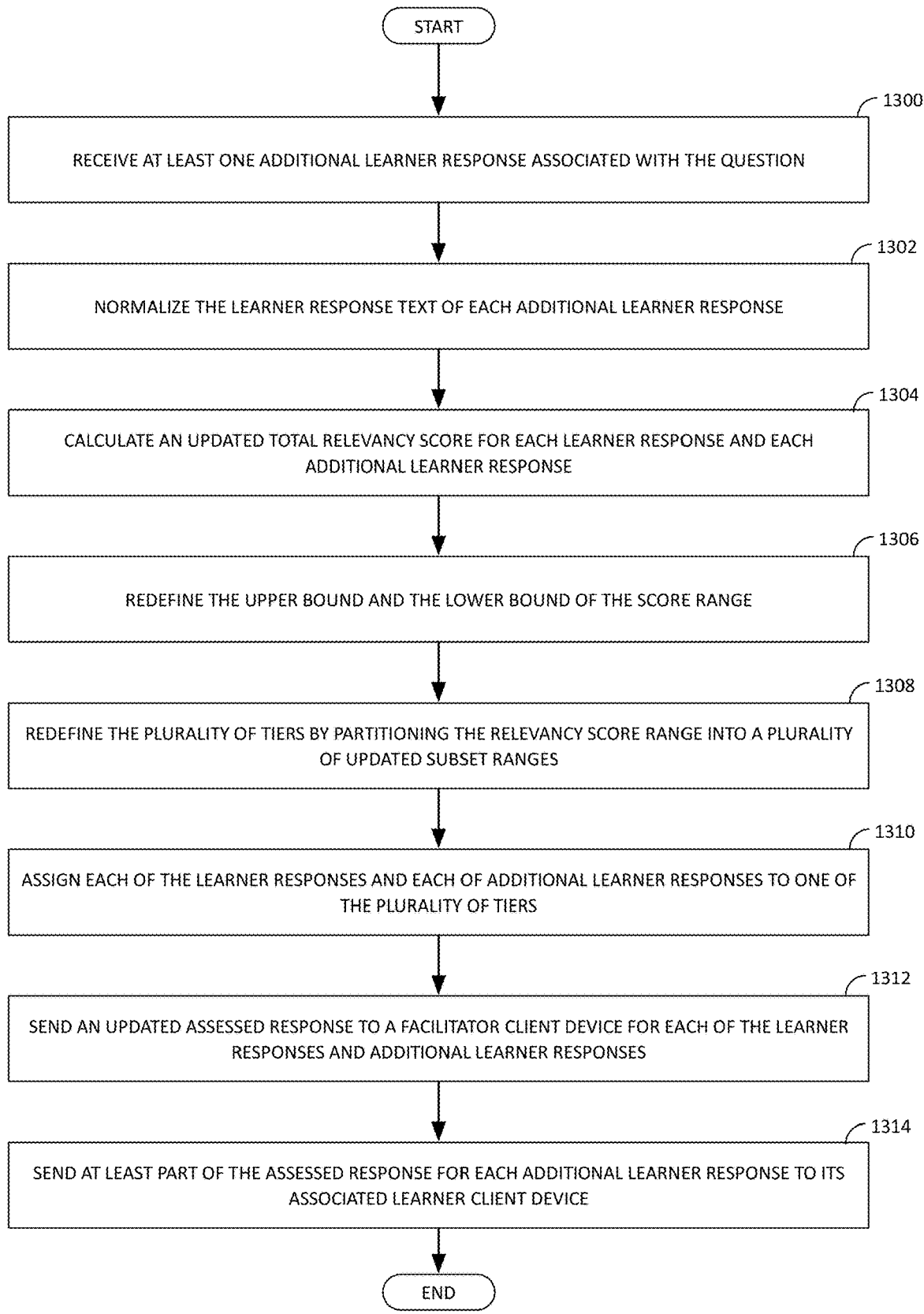
FIG. 13 shows a flow diagram showing an example of an assessor server's process for receiving additional learner responses.

FIG. 13 is a flow diagram showing the assessor server 102 process for receiving additional learner responses 126, according to various embodiments. In embodiments where the relevancy scoring is based in part upon a statistical analysis of the entire body of responses from a group of learners 120, adding additional learner responses 126 to the body will affect all scores, and may necessitate rescoring the entire body.

As shown, the process includes receiving at least one additional learner response 126 associated with the question 122. See, e.g., element 1300. Next, the process includes normalizing the learner response text 300 of each additional learner response 126. See, e.g., element 1302.

According to various embodiments, the process includes calculating an updated total relevancy score 400 for each learner response 126 and each additional learner response 126. See, e.g., element 1304. This in turn creates a need for redefining the upper bound 504 and the lower bound 506 of the score range 502 (See, e.g., element 1306) and redefining the plurality of tiers 402 by partitioning the relevancy score range 502 into a plurality of updated subset ranges 508 (See, e.g., element 1308).

As shown, the process further includes assigning each of the learner responses 126 and each of additional learner responses to one of the plurality of tiers 402. See, e.g., element 1310. The process also includes sending an updated assessed response 128 to a facilitator client device 106 for each of the learner responses 126 and additional learner responses 126 (See, e.g., element 1312) and sending at least part (e.g. tier, etc.) of the assessed response 128 for each additional learner response to its associated learner client device 104 (See, e.g., element 1314).

Figure 14:
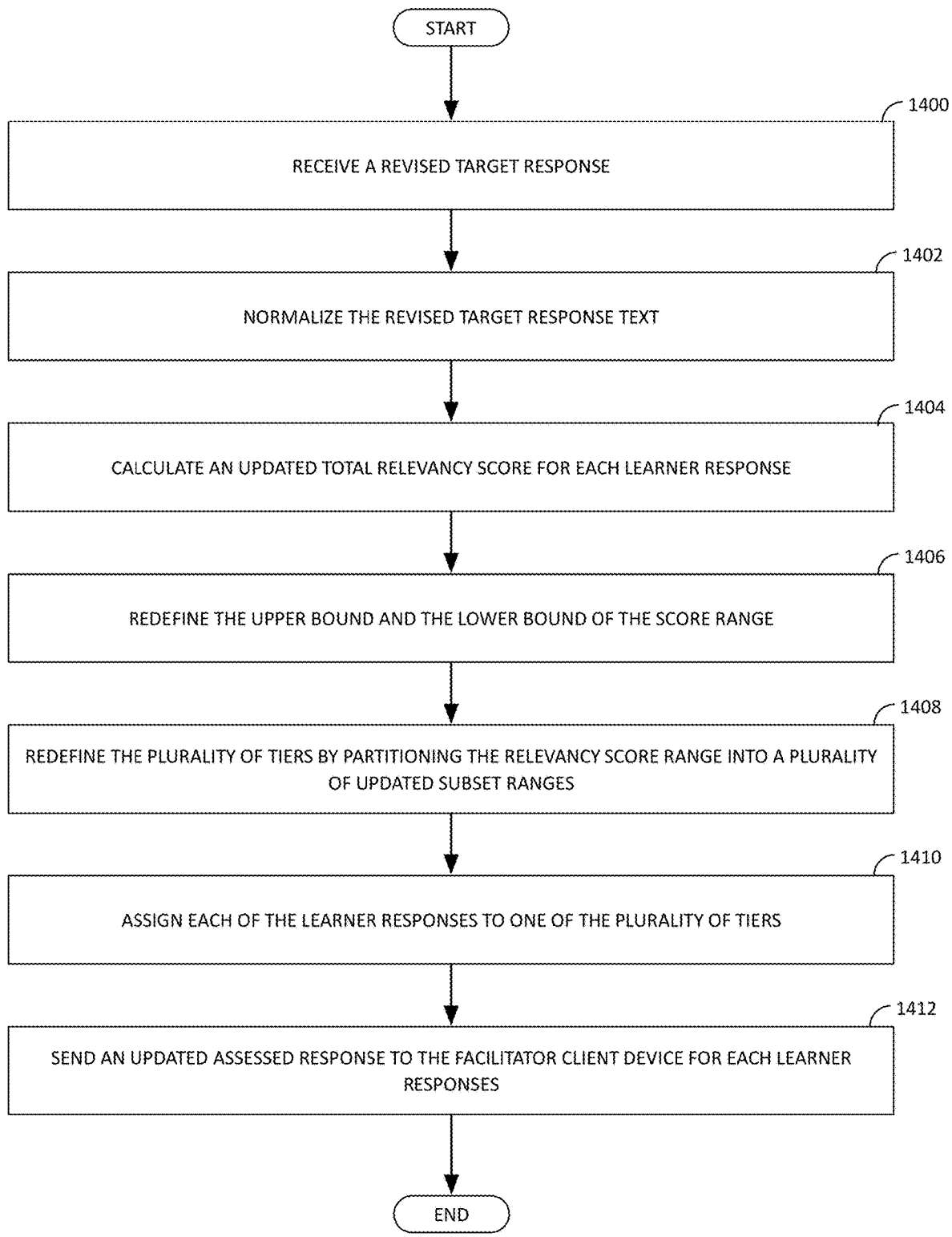
FIG. 14 shows a flow diagram showing an example of an assessor server's process for implementing an updated target response.

FIG. 14 is a flow diagram showing the assessor server's process for implementing an updated target response 124. In some instances, a facilitator 118 may wish to revise the targeting criteria after seeing the assessed results resulting from an initial target response. As a specific example, a facilitator 118 may wish to change the weighting of the keywords. According to various embodiments, the process for implementing an updated target response 124 includes receiving a revised target response 124. See, e.g., element 1400. In some embodiments, the revised target response 124 may be the result after modifying the original target response by at least one of an additional keyword and associated weight, an additional keyphrase and associated weight, a revised target response text, the removal of a keyword, the removal of a keyphrase, and an adjusted weight. In some embodiments, the modification of the target response 124 may be elected by the facilitator through a facilitator client device 106, while in other embodiments, the election may be obtained from one or more learner client devices 104 (e.g. class voting on best keyword or response, etc.).

Next, the process includes normalizing the target response text 200 of the revised target response 124. See, e.g., element 1402. According to various embodiments, the process includes calculating an updated total relevancy score 400 for each learner response 126. See, e.g., element 1404. This in turn creates a need for redefining the upper bound 504 and the lower bound 506 of the score range 502 (See, e.g., element 1406) and redefining the plurality of tiers 402 by partitioning the relevancy score range 502 into a plurality of updated subset ranges 508 (See, e.g., element 1408).

As shown, the process further includes assigning each of the learner responses 126 to one of the plurality of tiers 402. See, e.g., element 1410. Finally, the process also includes sending an updated assessed response 128 to the facilitator client device 106 for each of the learner responses 126. See, e.g., element 1412.

Figure 15:
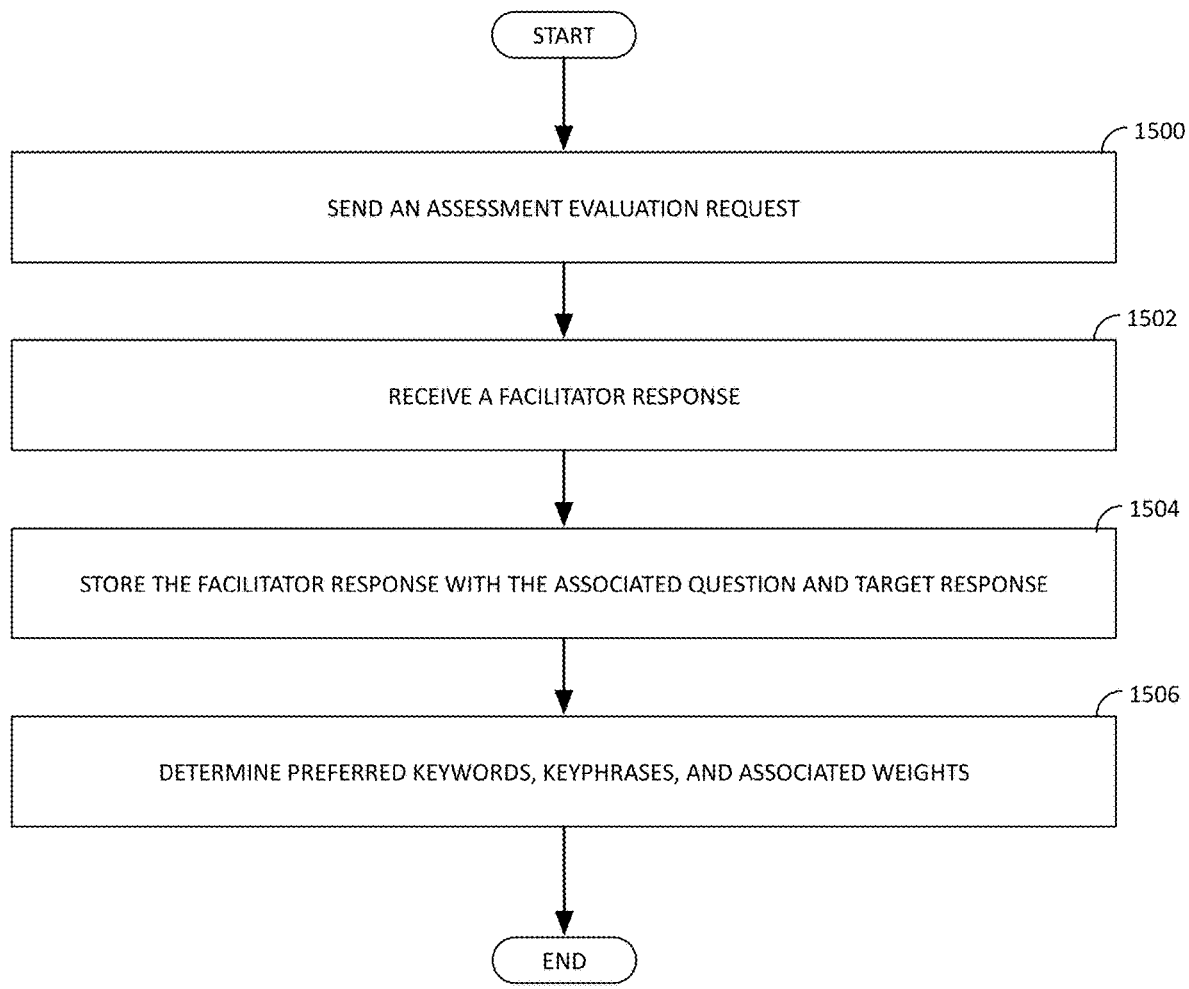
FIG. 15 shows a flow diagram showing an example of an assessor server's process for evaluating the assessment of depth-of-learning.

FIG. 15 is a flow diagram showing the assessor server 102 process for evaluating the assessment of depth-of-learning, according to various embodiments. The process includes sending an assessment evaluation request 132 from the assessor server 102. See, e.g., element 1500. After assessment, accuracy feedback can be obtained, such as from the facilitator. For example, once assessments have been computed and a lesson is completed, the facilitator 118 can receive a summary email asking them whether or not the assessment was considered accurate.

Next, the process includes receiving a facilitator response. See, e.g., element 1502. The facilitator response 134, which can include a yes or no response can be used to evaluate the assessment. The evaluation can be performed by a person or by a supervised learning data classifier (machine learning) to further refine the accuracy of the assessments over time. In other embodiments, the response may be more granular than yes or no.

As shown, the process further includes storing the facilitator response with the associated question and target response. See, e.g., element 1504. A database or library of preferred questions and responses can optionally be stored and made available to facilitators 118 as a resource for providing or creating questions 122 for their learners 120. For example, a facilitator 118 of a biology class could consult a library of questions 122, and use those exact questions, or variations thereof in presenting questions to his learners 120. The library of questions 122 could be organized by subject matter, popularity, relevance, or creator. For example, a facilitator 118 may know or respect a particular individual, friend, colleague, or mentor, and want to uses questions created or endorsed by that particular individual. As such, a social dimension of the system 100 can include a community sharing resources, questions and responses, and information relating to the use of those questions and responses, number of views, endorsements or likes, can be shared or reported back to the creator of the question or response. For example, a facilitator 118 could receive a notification that a question he used and then made available to the library was copied from, or used, from the library a certain number of times, and an update of the number of times the question was used can be reported to the question creator. Similarly, praise or feedback from other users or facilitators for the question can also be provided directly to the facilitator or as part of a forum or discussion group. Some users may want to "follow" or be updated on new questions or material created, presented, or shared by those users they are following.

In other embodiments, topic modeling by machine learning, including natural language processing to free form language to understanding what topics are being discussed, can be used to automatically identify, and select questions 122 for library availability and use. For example, a machine learning tool, program, or application can identify a topic or subject of a question, e.g., Space Travel, even if the words "space travel" are not in text of the question, and a Space Travel label or identifier can be assigned to the question and made available in the library to a community or group of Facilitators or users of the system. In any event, the sharing, tracking, and using of questions 122 from a library can be anonymous, non-anonymous or public, or a mixture of both. Machine learning and feedback from facilitators 118 can also be used for improving and changing algorithms used in relevancy assessment. Finally, the process may include determining preferred keywords, keyphrases, and associated weights. See, e.g., element 1506.

The present system 100, rather than being tied or directed to "correct" and "incorrect" answers, or to evaluating multiple choice answers, the current system 100 facilitates a dynamic, interactive, free-response type format that allows for depth-of-understanding to be assessed for relevance and presented in a simple and streamlined way that is presented to the facilitator 118 in a format that can be quickly processed, assimilated, and used in the classroom environment.

Additionally, the present system 100 is not simply adapted for aggregating free response answers, and creating a tally of those responses. For example, a simplistic approach or use of answers to free response type questions could include asking: "what is your favorite color" and then having learners enter a free response of "blue," "red," or any color, and then having the responses tallied to show the most popular color being the one with the most answers. The present system, as demonstrated, provides additional layers of value by assessing answers for relevancy and then presenting the relevancy of assessed answers in new and meaningful ways.

The assessment system 100 may be implemented in a variety of educational environments. As a specific, non-limiting example of one particular embodiment, Mr. Strutt, a science teacher (e.g. facilitator 118), will be giving a lecture on the nature of light and color. In preparation, Mr. Strutt interacts with the assessor server 102 using his laptop (e.g. facilitator client device 106), and prepares a series of questions 122 he wants to use to gauge whether his class (e.g. learners 120a-n) is understanding the material being presented. For each question 122, Mr. Strutt includes how he would hope a student would answer (e.g. words 202 in target response text 200), and indicates a number of keywords 204 and keyphrases 206 that must be present in a student response to indicate even the lowest level of understanding.

One such question transmitted by Mr. Strutt to the assessor server 102 included the question content 158 "Why is the sky blue?", to which Mr. Strutt answered "Air molecules scatter blue light more than red light" (e.g. words 202 of target response text 200), selecting the keywords 204 "molecules, scatter, blue, red, light" with weights 208 W1 through W5, and the keyphrases 206 "'more than red', 'less than blue'" with weights 208 W6 and W7. See FIG. 2. The assessor server 102 stores Mr. Strutt's question 122 and target response 124 in the lesson data 142 designated for his lecture on light and color, which is linked to the course data 140 for his science class this semester, all of which is stored in a storage 110 accessible by the assessor server 102. See, e.g., FIG. 1B.

Upon receipt of the target response text 200 for Mr. Strutt's question about the sky, the assessor server 102 normalizes it by removing non-standard characters (e.g. the period at the end of the response) and removing case (e.g. the capital A on 'Air'). The assessor server 102 would also remove stop words, but none were found.

Next, the assessor server 102 would correct any spelling errors found, using a subject-matter-specific dictionary. In this case, Mr. Strutt accidentally submitted 'scotter' rather than 'scatter'. A standard dictionary might correct this to read 'scooter', but the assessor server 102 was directed to use a dictionary of physics terms, and recognized the word should be 'scatter'. Finally, the normalization process is completed by lemmatizing each word in the response. See FIG. 12.

On the day of the lecture, before starting class, Mr. Strutt chooses to use "7CJC6" as a token 130 and submits it to the assessor server 102 through his laptop (e.g. facilitator client device 106) for association with the lesson data 142 for that day's lecture. He then enters the token 130 into a web interface of a computer (e.g. board client device 108) connected to the lecture hall's projection system. Soon, the projector is telling the assembling class to use the token "7CJC6". Each student (e.g. learner 120) enters the provided token 130 into their own phone, tablet, or laptop (e.g. learner client device 104), after which they are presented with a greeting from Mr. Strutt.

As the lecture proceeds, Mr. Strutt uses his laptop (e.g. faciliator client device 106) to send different prepared questions to the projector's computer (e.g. board client device 108) and to the personal devices of the class (e.g. learner client devices 104a-n). Upon presenting a question 122, the class enters a natural language response (e.g. learner response text 300) into the web interface of their device, and submit it anonymously to the assessor server 102 through the internet. Knowing that their responses are anonymous, the students are not reluctant to participate. Each natural language response is accompanied by a question ID 156 and an identifier 302 that will be used to direct assessed responses to the correct devices.

Upon being presented with the question, "Why is the sky blue?", one student (e.g. learner 120) submitted the response (e.g. learner response text 300) "The blue light gets dispersed more by the atmosphere.". A learner response data 126 (see FIG. 3) containing John's response and an identifier 302 linked to his phone is sent to the assessor server 102, which normalizes the text of his response.

After John's response has been normalized, his depth-of-understanding is assessed with respect to the question "Why is the sky blue?" by calculating a total relevancy score 400 for his response. See FIG. 5A. First, a relevancy score 500 is calculated for the normalized text of his response with respect to each word of the target response text 200, and in light of all learner responses received thus far. For example, the first word of the target response text is "air". John's response is scored with respect to the word "air" using term frequency/inverse document frequency, meaning the more the word "air" is found in John's response, the higher the relevancy score, while the greater the number of responses in which "air" is found at least once, the lower the relevancy score.

Words not found in the learner response text have a relevancy score of zero. Thus, the relevancy score 500 of John's response with respect to "air", R1, is zero. Had Mr. Strutt opted to allow the assessor server 102 to extrapolate his model answer, it may have included "atmosphere" in the target response text as a synonym of "air", and R1 might be non-zero.

For words or phrases that are keywords 204 (e.g. "molecules, scatter, blue, red, light") or keyphrases 206 (e.g. "'more than red', 'less than blue'"), the calculated relevancy score is multiplied by the weight. For example, the relevancy score 500 calculated for John's response with respect to the word "light" is R5, which is multiplied by the weight for the keyword "light", W5. All resulting scores, weighted or not, are summed to give a total relevance score 400.

Next, John's response is assigned to a tier 402. See FIG. 5B. After all responses received thus far have been scored, a relevancy score range 502 is defined, with the upper 504 and lower 506 bounds being defined by the highest and lowest calculated total relevancy scores. The range 502 is split into five equal segments, and each response is assigned to a tier based on which segment contains its total relevancy score. John's response falls into the third tier 402, and is thus deemed "Relevant". John's assessed response, along with two others, are sent to Mr. Strutt's laptop (e.g. facilitator client device 106), along with a response assessment summary 604. See FIG. 6. John receives his assessed response, indicating the assigned tier, on his phone.

Mr. Strutt sees John's response only received a score of "Relevant", but notices that he was not rewarded for using the word "atmosphere" instead of "air". At the click of a mouse on Mr. Strutt's laptop, John's response is projected by the lecture hall computer (e.g. board client device 108). John's identity is not shown, only his response and the assigned score. Mr. Strutt discusses the response with the class, and segues into a brief discussion on what the atmosphere is composed of. All agree that "atmosphere" is a better word than "air".

Mr. Strutt sends an amended target response that includes "atmosphere" as a keyword to the assessor server 102, whereafter all responses received thus far are scored against the new target response and assigned to tiers. John's response is now assessed as being in tier 4, "Very Relevant".

After the lecture is completed, the assessor server 102 sends Mr. Strutt an email summarizing the assessment of each question, and asking for a "yes" or "no" response to "Was this a good assessment?". The response email is processed by the assessor server 102, and stored with the questions and target response data for use in a future lesson or course.

Figure 16:
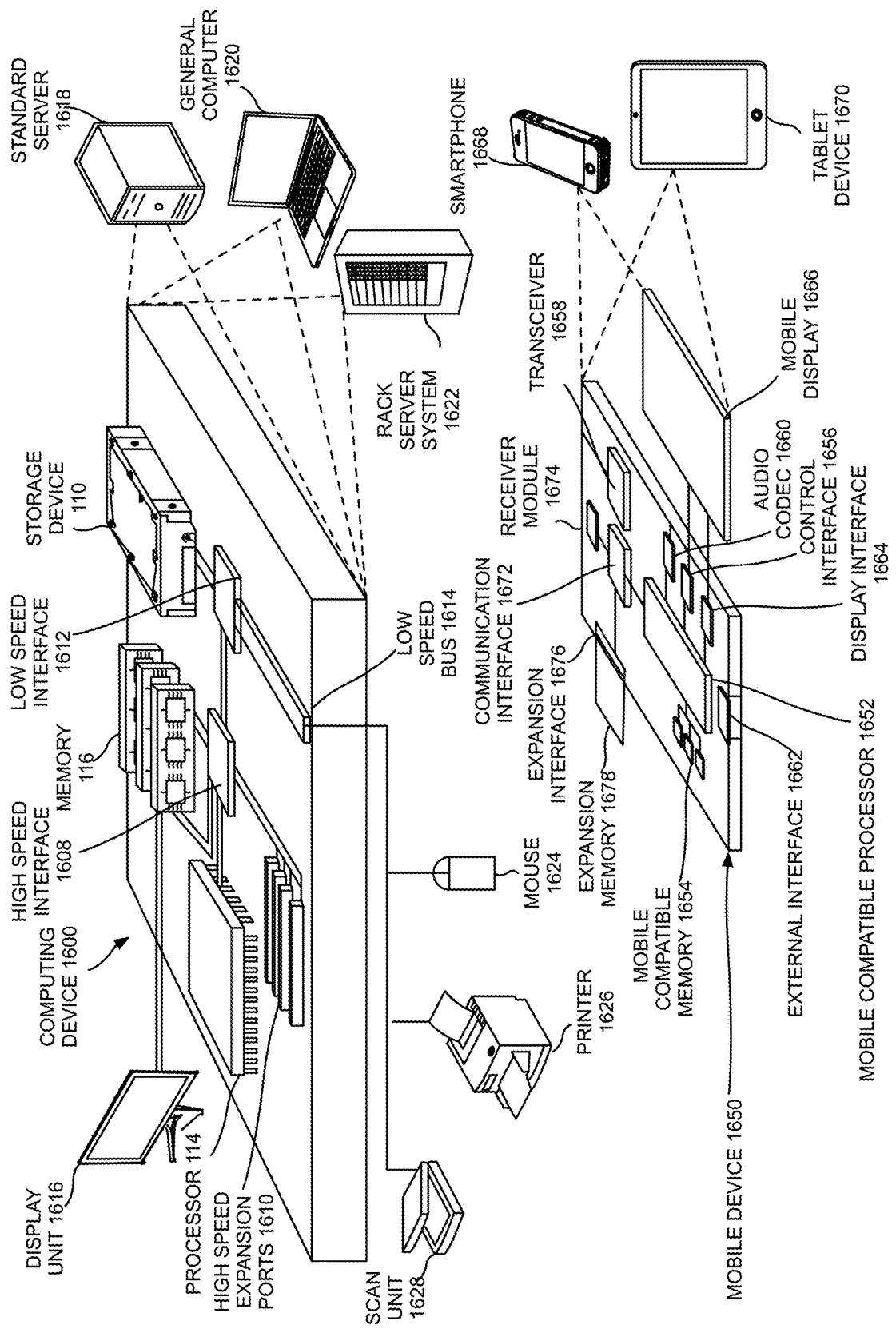
FIG. 16 shows a schematic diagram of exemplary data processing devices that can be used to implement the methods and systems disclosed herein.

FIG. 16 is a schematic diagram of specific computing device 1600 and a specific mobile computing device 1630 that can be used to perform and/or implement any of the embodiments disclosed herein. In one or more embodiments, assessor server 102, learner client device 104, facilitator client device 106 and/or board client device 108 of FIG. 1A may be the specific computing device 1600 or mobile device 1650, according to an embodiment.

The specific computing device 1600 may represent various forms of digital computers, such as laptops, desktops, workstations, personal digital assistants, servers, blade servers, mainframes, and/or other appropriate computers. The specific mobile computing device 1630 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to an embodiment.

The specific computing device 1600 may include a processor 114, a memory 116, a storage device 1606, a high-speed interface 1608 coupled to the memory 116 and a plurality of high speed expansion ports 1610, and a low speed interface 1612 coupled to a low speed bus 1614 and a storage device 1606. In an embodiment, each of the components heretofore may be inter-coupled using various buses, and may be mounted on a common motherboard and/or in other manners as appropriate. The processor 114 may process instructions for execution in the specific computing device 1600, including instructions stored in the memory 116 and/or on the storage device 1606 to display a graphical information for a GUI on an external input/output device, such as a display unit 1616 coupled to the high speed interface 1608, according to an embodiment.

In other embodiments, multiple processors and/or multiple buses may be used, as appropriate, along with multiple memories and/or types of memory. Also, a plurality of specific computing device 1600 may be coupled with, with each device providing portions of the necessary operations (e.g., as a server bank, a group of blade servers, and/or a multi-processor system).

The memory 116 may be coupled to the specific computing device 1600. In an embodiment, the memory 116 may be a volatile memory. In another embodiment, the memory 116 may be a non-volatile memory. The memory 116 may also be another form of computer-readable medium, such as a magnetic and/or an optical disk. The storage device 1606 may be capable of providing mass storage for the specific computing device 1600. In an embodiment, the storage device 1606 may be includes a floppy disk device, a hard disk device, an optical disk device, a tape device, a flash memory and/or other similar solid state memory device. In another embodiment, the storage device 1606 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 116, the storage device 1606, a memory coupled to the processor 114, and/or a propagated signal.

The high-speed interface 1608 may manage bandwidth-intensive operations for the specific computing device 1600, while the low speed interface 1612 may manage lower bandwidth-intensive operations. Such allocation of functions is exemplary only. In an embodiment, the high-speed interface 1608 may be coupled to the memory 116, the display unit 1616 (e.g., through a graphics processor and/or an accelerator), and to the plurality of high speed expansion ports 1610, which may accept various expansion cards.

In an embodiment, the low speed interface 1612 may be coupled to the storage device 1606 and the low speed bus 1614. The low speed bus 1614 may be comprised of a wired and/or wireless communication port (e.g., a Universal Serial Bus ("USB"), a Bluetooth® port, an Ethernet port, and/or a wireless Ethernet port). The low speed bus 1614 may also be coupled to the scan unit 1628, a printer 1626, a keyboard, a mouse 1624, and a networking device (e.g., a switch and/or a router) through a network adapter.

The specific computing device 1600 may be implemented in a number of different forms, as shown in the figure. In an embodiment, the specific computing device 1600 may be implemented as a standard server 1618 and/or a group of such servers. In another embodiment, the specific computing device 1600 may be implemented as part of a rack server system 1622. In yet another embodiment, the specific computing device 1600 may be implemented as a general computer 1620 such as a laptop or desktop computer. Alternatively, a component from the specific computing device 1600 may be combined with another component in a specific mobile computing device 1630. In one or more embodiments, an entire system may be made up of a plurality of specific computing device 1600 and/or a plurality of specific computing device 1600 coupled to a plurality of specific mobile computing device 1630.

In an embodiment, the specific mobile computing device 1630 may include a mobile compatible processor 1632, a mobile compatible memory 1634, and an input/output device such as a mobile display 1646, a communication interface 1652, and a transceiver 1638, among other components. The specific mobile computing device 1630 may also be provided with a storage device, such as a microdrive or other device, to provide additional storage. In an embodiment, the components indicated heretofore are inter-coupled using various buses, and several of the components may be mounted on a common motherboard.

The mobile compatible processor 1632 may execute instructions in the specific mobile computing device 1630, including instructions stored in the mobile compatible memory 1634. The mobile compatible processor 1632 may be implemented as a chipset of chips that include separate and multiple analog and digital processors. The mobile compatible processor 1632 may provide, for example, for coordination of the other components of the specific mobile computing device 1630, such as control of user interfaces, applications run by the specific mobile computing device 1630, and wireless communication by the specific mobile computing device 1630.

The mobile compatible processor 1632 may communicate with a user through the control interface 1636 and the display interface 1644 coupled to a mobile display 1646. In an embodiment, the mobile display 1646 may be a Thin-Film-Transistor Liquid Crystal Display ("TFT LCD"), an Organic Light Emitting Diode ("OLED") display, and another appropriate display technology. The display interface 1644 may comprise appropriate circuitry for driving the mobile display 1646 to present graphical and other information to a user. The control interface 1636 may receive commands from a user and convert them for submission to the mobile compatible processor 1632.

In addition, an external interface 1642 may be provide in communication with the mobile compatible processor 1632, so as to enable near area communication of the specific mobile computing device 1630 with other devices. External interface 1642 may provide, for example, for wired communication in some embodiments, or for wireless communication in other embodiments, and multiple interfaces may also be used.

The mobile compatible memory 1634 may be coupled to the specific mobile computing device 1630. The mobile compatible memory 1634 may be implemented as a volatile memory and a non-volatile memory. The expansion memory 1658 may also be coupled to the specific mobile computing device 1630 through the expansion interface 1656, which may comprise, for example, a Single In Line Memory Module ("SIMM") card interface. The expansion memory 1658 may provide extra storage space for the specific mobile computing device 1630, or may also store an application or other information for the specific mobile computing device 1630.

Specifically, the expansion memory 1658 may comprise instructions to carry out the processes described above. The expansion memory 1658 may also comprise secure information. For example, the expansion memory 1658 may be provided as a security module for the specific mobile computing device 1630, and may be programmed with instructions that permit secure use of the specific mobile computing device 1630. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In an embodiment, a computer program comprises a set of instructions that, when executed, perform one or more methods. The set of instructions may be stored on the mobile compatible memory 1634, the expansion memory 1658, a memory coupled to the mobile compatible processor 1632, and a propagated signal that may be received, for example, over the transceiver 1638 and/or the external interface 1642.

The specific mobile computing device 1630 may communicate wirelessly through the communication interface 1652, which may be comprised of a digital signal processing circuitry. The communication interface 1652 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 1638 (e.g., radio-frequency transceiver). In addition, short-range communication may occur, such as using a Bluetooth®, Wi-Fi, and/or other such transceiver. In addition, a GPS ("Global Positioning System") receiver module 1654 may provide additional navigation-related and location-related wireless data to the specific mobile computing device 1630, which may be used as appropriate by a software application running on the specific mobile computing device 1630.

The specific mobile computing device 1630 may also communicate audibly using an audio codec 1640, which may receive spoken information from a user and convert it to usable digital information. The audio codec 1640 may likewise generate audible sound for a user, such as through a speaker (e.g., in a handset smartphone of the specific mobile computing device 1630). Such a sound may comprise a sound from a voice telephone call, a recorded sound (e.g., a voice message, a music files, etc.) and may also include a sound generated by an application operating on the specific mobile computing device 1630.

The specific mobile computing device 1630 may be implemented in a number of different forms, as shown in the figure. In an embodiment, the specific mobile computing device 1630 may be implemented as a smartphone 1648. In another embodiment, the specific mobile computing device 1630 may be implemented as a personal digital assistant ("PDA"). In yet another embodiment, the specific mobile computing device, 1630 may be implemented as a tablet device 1650.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back-end component (e.g., as a data server), a middleware component (e.g., an application server), a front-end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In an embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other methods could be intermixed or substituted with those provided. In places where the description above refers to particular methods, it should be readily apparent that a number of modifications may be made without departing from the spirit thereof and that these embodiments and implementations may be applied to other to educational technologies as well. Accordingly, the disclosed subject matter is intended to embrace all such alterations, modifications and variations that fall within the spirit and scope of the disclosure and the knowledge of one of ordinary skill in the art.

What is claimed is:

1. A computer-implemented method of automatically assessing depth-of-understanding, comprising:

receiving, by an assessor server, a target response associated with a question, the target response comprising a target response text, the target response text comprising at least one of a word, a keyword, or a keyphrase;

receiving, by the assessor server, at least one learner response associated with the question, each of the at least one learner response being received through a network from a different learner client device and comprising a learner response text and an identifier;

normalizing, with a processor of the assessor server, the learner response text of each of the at least one learner response;

normalizing, with the processor, the target response text;

calculating, with the processor, a total relevancy score for each of the at least one learner responses by determining a relevancy score with respect to each of the at least one word, keyword, or keyphrase in the target response text and in light of all learner responses and summing all relevancy scores determined for each learner response;

defining, with the processor, a plurality of tiers by partitioning a relevancy score range having an upper bound and a lower bound into a plurality of subset ranges, each tier of the plurality of tiers describing one of the plurality of subset ranges;

assigning, with the processor, each of the at least one learner responses to one of the plurality of tiers based upon which of the plurality of subset ranges contains the total relevancy score of the learner response;

sending, to a facilitator client device, an assessed response for each of the at least one learner responses, the assessed response comprising one of the at least one learner responses and at least one of the associated total relevancy score and the associated tier;

sending, by the assessor server, at least part of the assessed response for each of the at least one learner responses to the learner client device associated with the identifier of the learner response;

wherein the assignment of each of the at least one learner response to one of the plurality of tiers is substantially concurrent with the receipt of the at least one learner response;

receiving, by the assessor server after assignment of each of the at least one learner response to one of the plurality of tiers, at least one additional learner response associated with the question;

normalizing, with the processor, the learner response text of each of the at least one additional learner responses;

calculating, with the processor, an updated total relevancy score for each of the at least one learner responses and each of the at least one additional learner responses;

redefining, with the processor, the upper bound and the lower bound of the score range based at least in part upon the updated total relevancy scores;

redefining, with the processor, the plurality of tiers by partitioning the relevancy score range into a plurality of updated subset ranges, each tier of the plurality of tiers describing one of the plurality of updated subset ranges;

assigning, with the processor, each of the at least one learner response and each of the at least one additional learner response to one of the plurality of tiers based upon which of the plurality of updated subset ranges contains the associated updated total relevancy score;

sending, to the facilitator client device, an updated assessed response for each of the at least one learner response and each of the at least one additional learner response, each updated assessed response comprising one of the at least one learner response or additional learner response and the associated updated total relevancy score and tier.

2. The computer-implemented method of claim 1, wherein the relevancy score with respect to each of the at least one word, keyword, or keyphrase in the target response text is determined using a term frequency/inverse document frequency (TF/IDF) weighting.

3. The computer-implemented method of claim 1:
wherein the target response text comprises at least one keyword or keyphrase and the target response comprises a weight associated with each of the at least one keyword or keyphrase; and
wherein calculating the total relevancy score further comprises multiplying any relevancy score determined with respect to each of the at least one keyword or keyphrase by the associated weight before the relevancy scores are summed for each of the at least one learner responses.

4. The computer-implemented method of claim 1, further comprising:
receiving, from the facilitator client device, a revised target response, the revised target response comprising the target response modified by at least one of an additional keyword and associated weight, an additional keyphrase and associated weight, a revised target response text, the removal of a cancelled keyword, the removal of a cancelled keyphrase and an adjusted weight;
calculating, with the processor, an updated total relevancy score for each of the at least one learner response;
redefining, with the processor, the upper bound and the lower bound of the score range based at least in part upon the updated total relevancy scores;
redefining, with the processor, the plurality of tiers by partitioning the relevancy score range into a plurality of updated subset ranges, each tier of the plurality of tiers describing one of the plurality of updated subset ranges;
assigning, with the processor, each of the at least one learner response to one of the plurality of tiers based upon which of the plurality of updated subset ranges contains the associated updated total relevancy score;
sending, to the facilitator client device, an updated assessed response for each of the at least one learner response, each updated assessed response comprising one of the at least one learner response, the associated updated total relevancy score and associated tier.

5. The computer-implemented method of claim 1, further comprising:
receiving, by the assessor server, a course data comprising a lesson data, the lesson data comprising the question;
associating a token with the lesson data;
receiving, from a learner client device, the token;
receiving, from a board client device, the token;
sending, by the assessor server, the question to at least one of the learner client device and the board client device; and
sending, to the board client device, at least one of the learner response text of one of the at least one assessed response, a response assessment summary, and at least part of the target response text, in response to a display command received from the facilitator client device;
wherein the facilitator client device, the learner client device, and the board client device all comprise a web interface.

6. The computer-implemented method of claim 1, wherein normalizing comprises at least one of removing non-standard characters, removing case, removing one or more stop words, lemmatizing, and correcting spelling using a subject-matter-specific dictionary.

7. The computer-implemented method of claim 1, further comprising:
extrapolating, with the processor, the target response text by automatically identifying related keywords, related keyphrases, and associated weights based upon at least one of historical questions, materials associated with a course, materials associated with a lesson, and a subject-matter-specific dictionary.

8. The computer-implemented method of claim 1, further comprising:
sending, by the assessor server, an assessment evaluation request;
receiving, by the assessor server, a facilitator response; and
storing the facilitator response with the associated question and target response.

9. The computer-implemented method of claim 1, wherein the lower bound is the lowest total relevancy score calculated for the at least one learner responses, and the upper bound is the highest total relevancy score calculated for the at least one learner responses.

10. The computer-implemented method of claim 1, further comprising:
sorting the at least one assessed responses by one of the total relevancy score, a timestamp, a number of identified keywords, and a number of identified keyphrases; and
filtering the at least one assessed responses by at least one of a word, a keyword, a keyphrase, a content type, and a tier.

11. A computer-implemented method of automatically assessing depth-of-understanding, comprising:
receiving, by an assessor server, a target response associated with a question, the target response comprising a target response text, the target response text comprising at least one of a word, a keyword, or a keyphrase;
receiving, by the assessor server, at least one learner response associated with the question, each of the at least one learner response being received through a network from a different learner client device and comprising a learner response text and an identifier;

normalizing, with a processor of the assessor server, the learner response text of each of the at least one learner response;
normalizing, with the processor, the target response text;
calculating, with the processor, a total relevancy score for each of the at least one learner responses by determining a relevancy score with respect to each of the at least one word, keyword, or keyphrase in the target response text and in light of all learner responses and summing all relevancy scores determined for each learner response;
defining, with the processor, a plurality of tiers by partitioning a relevancy score range having an upper bound and a lower bound into a plurality of subset ranges, each tier of the plurality of tiers describing one of the plurality of subset ranges;
assigning, with the processor, each of the at least one learner responses to one of the plurality of tiers based upon which of the plurality of subset ranges contains the total relevancy score of the learner response;
wherein the assignment of each of the at least one learner response to one of the plurality of tiers is substantially concurrent with the receipt of the at least one learner response;
receiving, by the assessor server, at least one additional learner response associated with the question; and
calculating, with the processor, an updated total relevancy score for each of the at least one learner responses and each of the at least one additional learner responses.

12. The computer-implemented method of claim 11, wherein the relevancy score with respect to each of the at least one word, keyword, or keyphrase in the target response text is determined using a term frequency/inverse document frequency (TF/IDF) weighting.

13. The computer-implemented method of claim 11:
wherein the target response text comprises at least one keyword or keyphrase and the target response comprises a weight associated with each of the at least one keyword or keyphrase; and
wherein calculating the total relevancy score further comprises multiplying any relevancy score determined with respect to each of the at least one keyword or keyphrase by the associated weight before the relevancy scores are summed for each of the at least one learner responses.

14. The computer-implemented method of claim 11, further comprising:
receiving, by the assessor server, at least one additional learner response associated with the question;
normalizing, with the processor, the learner response text of each of the at least one additional learner responses;
calculating, with the processor, an updated total relevancy score for each of the at least one learner responses and each of the at least one additional learner responses;
redefining, with the processor, the upper bound and the lower bound of the score range based at least in part upon the updated total relevancy scores;
redefining, with the processor, the plurality of tiers by partitioning the relevancy score range into a plurality of updated subset ranges, each tier of the plurality of tiers describing one of the plurality of updated subset ranges; and
assigning, with the processor, each of the at least one learner response and each of the at least one additional learner response to one of the plurality of tiers based upon which of the plurality of updated subset ranges contains the associated updated total relevancy score.

15. The computer-implemented method of claim 11, further comprising:
receiving, by the assessor server, a revised target response, the revised target response comprising the target response modified by at least one of an additional keyword and associated weight, an additional keyphrase and associated weight, a revised target response text, the removal of a cancelled keyword, the removal of a cancelled keyphrase and an adjusted weight;
calculating, with the processor, an updated total relevancy score for each of the at least one learner response;
redefining, with the processor, the upper bound and the lower bound of the score range based at least in part upon the updated total relevancy scores;
redefining, with the processor, the plurality of tiers by partitioning the relevancy score range into a plurality of updated subset ranges, each tier of the plurality of tiers describing one of the plurality of updated subset ranges; and
assigning, with the processor, each of the at least one learner response to one of the plurality of tiers based upon which of the plurality of updated subset ranges contains the associated updated total relevancy score.

16. A system for automatically assessing depth-of-understanding, comprising:
a facilitator client device;
a plurality of learner client devices;
an assessor server communicatively coupled to the facilitator client device and the plurality of learner client devices through a network, the assessor server comprising a processor and a memory, and configured to:
associate a token with a lesson data comprising a question;
receive the token from each of the plurality of learner client devices;
receive a target response associated with the question, the target response comprising a target response text, the target response text comprising at least one of a word, a keyword, or a keyphrase;
receive at least one learner response associated with the question, each of the at least one learner response being received through the network from one of the plurality of learner client devices and comprising a learner response text and an identifier;
normalize the learner response text of each of the at least one learner response;
normalize the target response text;
calculate a total relevancy score for each of the at least one learner responses by determining a relevancy score with respect to each of the at least one word, keyword, or keyphrase in the target response text and in light of all learner responses and summing all relevancy scores determined for each learner response;
define, with the processor, a plurality of tiers by partitioning a relevancy score range having an upper bound and a lower bound into a plurality of subset ranges, each tier of the plurality of tiers describing one of the plurality of subset ranges;
assign, with the processor, each of the at least one learner responses to one of the plurality of tiers based upon which of the plurality of subset ranges contains the total relevancy score of the learner response;
send to the facilitator client device, concurrent with the lesson data, an assessed response for each of the at least one learner responses, the assessed response comprising one of the at least one learner responses and the associated total relevancy score and assigned tier;

receive at least one additional learner response associated with the question;

calculate an updated total relevancy score for each of the at least one learner responses and each of the at least one additional learner responses; and wherein the assignment of each of the at least one learner response to one of the plurality of tiers is substantially concurrent with the receipt of the at least one learner response.

17. The system of claim 16, further comprising:

a board client device;

wherein the assessor server is further configured to receive the token from the board client device and send the question to at least one of the plurality of learner client devices and the board client device.

18. The system of claim 16:

wherein the relevancy score with respect to each of the at least one word, keyword, or keyphrase in the target response text is determined using a term frequency/inverse document frequency (TF/IDF) weighting;

wherein the target response text comprises at least one keyword or keyphrase and the target response comprises a weight associated with each of the at least one keyword or keyphrase; and wherein calculating the total relevancy score further comprises multiplying any relevancy score determined with respect to each of the at least one keyword or keyphrase by the associated weight before the relevancy scores are summed for each of the at least one learner responses.

\* \* \* \* \*